United States Patent
Newman et al.

(10) Patent No.: US 7,937,286 B2
(45) Date of Patent: May 3, 2011

(54) SYSTEM AND METHOD FOR ANALYZING MARKETING EFFORTS

(75) Inventors: Alan B. Newman, Huntington, NY (US); Noor A. Menai, Summit, NJ (US)

(73) Assignee: Citicorp Credit Services, Inc., Long Island City, NY (US)

(*) Notice: Subject to any disclaimer, the term of this patent is extended or adjusted under 35 U.S.C. 154(b) by 133 days.

(21) Appl. No.: 10/864,529

(22) Filed: Jun. 10, 2004

(65) Prior Publication Data

US 2005/0055275 A1    Mar. 10, 2005

Related U.S. Application Data

(60) Provisional application No. 60/477,057, filed on Jun. 10, 2003.

(51) Int. Cl.
    *G06F 17/30* (2006.01)
(52) U.S. Cl. .......................................................... 705/10
(58) Field of Classification Search ................... 705/14, 705/10, 7; 707/6
    See application file for complete search history.

(56) References Cited

U.S. PATENT DOCUMENTS

| | | | |
|---|---|---|---|
| 4,331,973 A | 5/1982 | Eskin et al. | 358/84 |
| 4,355,372 A * | 10/1982 | Johnson et al. | 379/92.04 |
| RE31,951 E | 7/1985 | Johnson et al. | 364/900 |
| 4,603,232 A * | 7/1986 | Kurland et al. | 379/92.04 |
| 5,822,744 A * | 10/1998 | Kesel | 706/52 |
| 5,893,098 A * | 4/1999 | Peters et al. | 1/1 |
| 5,913,204 A * | 6/1999 | Kelly | 705/500 |
| 6,233,564 B1 | 5/2001 | Schulze, Jr. | 705/14 |
| 6,236,975 B1 * | 5/2001 | Boe et al. | 705/7 |
| 6,256,663 B1 * | 7/2001 | Davis | 709/204 |
| 6,334,110 B1 * | 12/2001 | Walter et al. | 705/14 |
| 6,456,981 B1 * | 9/2002 | Dejaeger et al. | 705/14 |
| 6,505,168 B1 * | 1/2003 | Rothman et al. | 705/10 |
| 6,594,638 B1 * | 7/2003 | Feldman et al. | 705/14 |
| 6,778,807 B1 * | 8/2004 | Martino et al. | 434/362 |
| 6,826,540 B1 * | 11/2004 | Plantec et al. | 705/10 |
| 6,836,773 B2 * | 12/2004 | Tamayo et al. | 707/6 |
| 7,181,696 B2 * | 2/2007 | Brock | 715/758 |
| 2001/0037206 A1 | 11/2001 | Falk et al. | 705/1 |
| 2002/0052776 A1 * | 5/2002 | Rothman et al. | 705/10 |
| 2002/0072974 A1 | 6/2002 | Pugliese, III et al. | 705/14 |
| 2002/0107719 A1 | 8/2002 | Tsang et al. | 705/10 |
| 2002/0123957 A1 | 9/2002 | Notarius et al. | 705/37 |
| 2002/0174013 A1 | 11/2002 | Freeman et al. | 705/14 |
| 2003/0027635 A1 | 2/2003 | Walker et al. | 463/40 |
| 2003/0088436 A1 | 5/2003 | Berger et al. | 705/1 |
| 2003/0093414 A1 | 5/2003 | Litzow et al. | 707/3 |

(Continued)

OTHER PUBLICATIONS

Harris, Jeanne G. "Finding the Customer in Transaction Data". Dec. 1999. Accenture. pp. 1-7.*

(Continued)

*Primary Examiner* — Peter Choi
(74) *Attorney, Agent, or Firm* — Erie L. Sophir; SNR Denton LLP

(57) ABSTRACT

The present invention relates to a method and system for evaluating the cause and effect of advertising and marketing programs using card transaction data. In one embodiment, access is provided to voluminous card-holder transaction data detailing accurate-to-the-penny transaction amounts, twenty-four hour active customers, and a multi-year transaction history per customer. Furthermore, such data is captured in real-time, and due to the sample size, can provide granular, statistically significant information at a local level for client and merchant coverage.

20 Claims, 20 Drawing Sheets

U.S. PATENT DOCUMENTS

| | | | |
|---|---|---|---|
| 2003/0149623 A1* | 8/2003 | Chen | 705/14 |
| 2003/0204436 A1* | 10/2003 | Flender et al. | 705/10 |
| 2004/0059634 A1 | 3/2004 | Tami et al. | 705/17 |

OTHER PUBLICATIONS

Fayyad, Usama. "Optimizing Customer Insight". May 13, 2003. <http://www.intelligententerprise.com//030513/608feat1_1.jhtml>.*

Hall, Andrew. "Data Mining—Management Issues". Apr. 5, 1998. <http://www.anderson.ucla.edu/faculty/jason.frand/teacher/technologies/hall/index.htm>.*

Palace, Bill. "Data Mining: What is Data Mining?". Jun. 1996. <http://www.anderson.ucla.edu/faculty/jason.frand/technologies/palace/index.htm>.*

"Qualitative Marketing Software—QMSoft—Announces Centrus Customer Interaction Objects". Apr. 20, 1999. Business Wire.*

Preliminary Examination Report for Application No. PCT/US02/04961, dated Jun. 23, 2004 (mailing date).

"Confirmit for Markets—Market Intelligence Insight" [online], 1 p., Retrieved from the Internet: www.confirmit.com.

Confirmit White Paper—"The Standard for Web-Enabled Information Gathering and Feedback" [online], Jul. 9, 2001, 24 pp., Retrieved from the Internet: www.confirmit.com.

"Personicx by Acxiom Awarded 'Product of the Year' by Customer Inter@ction Solutions Magazine; Personicx Recognized as a 'Clear Leader' in the Segmentation Sector," *Business Wire*, p. 0166, Jan. 17, 2003.

A. Apte, et al., "Segmentation-Based Modeling for Advanced Targeted Marketing," *KDD '01*, pp. 408-413, 2001.

Cadez, I. V., et al., "Probabilistic Modeling of Transaction Data with Applications to Profiling, Visualization, and Prediction," *KDD '01*, pp. 37-46, 2001.

Chou, Paul B., et al., "Identifying Prospective Customers," *KDD 2000*, pp. 447-456, 2000.

Gardner, Dr. Stephen R., "Data Warehousing and Customer Care—How You Can Treat Every Customer With the Individual Attention He Demands," *Communications News*, 3 pp., Dec. 1999.

Rastogi, R., et al., "Tutorial 2. Scalable Algorithms for Mining Large Databases," *KDD-99, Tutorial Notes*, pp. 73-140, 1999.

Stock, Helen, "Firm Using Phone Card as ATM Survey Incentive," *American Banker*, vol. 164, Iss. 154, p. 8, Aug. 12, 1999.

Trustman, John, et al., "Dilbert's Revenge Revenge," *Intelligent Enterprise*, pp. 16(1), Oct. 1998.

Kannan, P. K., et al., "Marketing Information on the I-Way, Data Junkyard or Information Gold Mine?," *Communications of the ACM*, vol. 41, No. 3, pp. 35-43, Mar. 1998.

Friedland, Liam, "Accessing the Data Warehouse: Designing Tools to Facilitate Business Understanding," *Interactions*, pp. 25-36, Jan.+Feb. 1998.

Goodman, John, et al., "Maximizing the Value of Customer Feedback," *Quality Progress*, pp. 35-39, Dec. 1996.

Dempsey, Karen, "Up Close and Personal," *Marketing*, Direct Marketing, pp. III-IV, Jul. 11, 1996.

Kinnaird, Donald, et al., "Market Segmentation of Retail Bank Services: A Model for Management," *Journal of Retail Banking*, vol. 6, Iss. 3, Fall, 1984 (Abstract Only—1 p.).

International Search Report and Written Opinion for Application No. PCT/US04/18444, dated Jul. 5, 2005 (mailing date).

* cited by examiner

1999-2001 U.S. AD EXPENDITURES

| | 1999 ($MILLIONS) | 2000 ($MILLIONS) | 2001 ($MILLIONS) | % CHANGE (99-00) | % CHANGE (00-01) |
|---|---|---|---|---|---|
| NATIONAL | | | | | |
| NEWSPAPERS | 6,358 | 7,229 | $6,615 | 13.7% | -8.5% |
| MAGAZINES | 11,433 | 12,370 | 11,095 | 8.2% | -10.3% |
| NETWORK TV (4 Networks) | 13,961 | 15,888 | 14,300 | 13.8% | -10.0% |
| SPOT TV | 10,500 | 12,264 | 9,223 | 16.8% | -24.8% |
| CABLE TV | 9,405 | 11,765 | 11,883 | 25.1% | 1.0% |
| SYNDICATED TV | 2,870 | 3,108 | 3,102 | 8.3% | -0.2% |
| NETWORK RADIO | 684 | 780 | 711 | 14.0% | -8.8% |
| SPOT RADIO | 3,275 | 3,668 | 2,956 | 12.0% | -19.4% |
| YELLOW PAGES | 1,986 | 2,093 | 2,087 | 5.4% | -0.3% |
| INTERNET | 2,832 | 6,507 | 5,752 | 129.8% | -11.6% |
| BUSINESS Papers | 4,274 | 4,915 | 4,468 | 15.0% | -9.1% |
| OUT OF HOME | 1,910 | 2,068 | 2,051 | 8.3% | -0.8% |
| DIRECT MAIL | 41,403 | 44,591 | 44,725 | 7.7% | 0.3% |
| MISCELLANEOUS | 21,279 | 24,418 | 22,829 | 14.8% | -6.5% |
| TOTAL NATIONAL ADV. | 132,170 | 151,664 | 141,797 | 14.7% | -6.5% |
| LOCAL | | | | | |
| NEWSPAPERS | 40,290 | 41,821 | 37,640 | 3.8% | -10.0% |
| LOCAL TV | 12,680 | 13,542 | 12,256 | 6.8% | -9.5% |
| CABLE TV | 3,165 | 3,690 | 3,653 | 16.6% | -1.0% |
| LOCAL RADIO | 13,256 | 14,847 | 14,194 | 12.0% | -4.4% |
| BILLBOARDS | 2,870 | 3,108 | 3,083 | 8.3% | -0.8% |
| YELLOW PAGES | 10,666 | 11,135 | 11,505 | 4.4% | 3.3% |
| MISCELLANEOUS | 7,211 | 7,665 | 7,159 | 6.3% | -6.6% |
| TOTAL LOCAL ADV. | 90,138 | 95,808 | 89,490 | 6.3% | -6.6% |
| TOTAL ALL ADVERTISING | 222,308 | 247,472 | 231,287 | 11.3% | -6.5% |

Note: Expenditures include all commissions and expenses in the advertising budget.
Source: Robert J. Coen, Universal McCann, 2002.

FIG. 1

SYSTEM AND METHOD FOR ANALYZING MARKETING EFFORTS

PRIORITY

This application claims priority to U.S. Provisional Patent Application No. 60/477,057, filed Jun. 10, 2003, entitled, "SYSTEM AND METHOD FOR ANALYZING MARKETING EFFORTS," which is herein incorporated by reference in its entirety.

BACKGROUND OF THE INVENTION

1. Field of the Invention

The present invention relates to analyzing marketing efforts. More particularly, the present invention relates to a system and method for evaluating the cause and effect of advertising and marketing programs using card transaction data.

2. Background

Consumers spend over $7 trillion each year on products and services that are distributed amongst an enormous number of participants. Competition for consumer spending is intense and has steadily grown over the last two decades accompanied by increased marketing and product proliferation. Currently, there is more than $233 billion spent on advertising and marketing by companies in the US alone. According to a study by the Federal Reserve Bank of Dallas, more than 30,000 new consumer product stock-keeping units (SKUs) are introduced annually today compared with only 4,400 in 1980. All this marketing and introduction of new products in the consumer market is for the same basic objectives: build new customer relationships through prospecting, enhance loyalty and capture a greater share of wallet from existing customers, and keep the most profitable customers.

The net result of all this activity is that consumers are not only being inundated by marketing messages but they also have to choose between many more options than ever before. For the players in the consumer market this means that each dollar spent on marketing is having less of an impact and becomes more costly as competitive pressures drive margins lower. Coupled with shortening business cycles and quicker competitive reaction to success, survival and profitability is predicated on the ability to make quick, accurate and meaningful decisions on where to allocate spending and how to most effectively target and reach the right customers.

Therefore, to be successful, manufacturers, merchants and service providers are being forced to commit significant effort and capital to understanding how to improve on (a) determining who is buying their product, why, when and where; (b) selling the right product in the right marketplace; (c) gleaning consumer feedback to try and improve their products and services or to design new ones; (d) targeting the consumers that buy the most, most frequently and most recently; and (e) targeting those customers that are most likely to buy.

Analytics and the information required for effective analyses have seen a more significant role given the situation consumer-oriented companies find themselves in at present. In the past decade, companies have spent billions of dollars on warehousing and analyzing their own data.

However, gaining real insight into customer behavior is still an extremely difficult goal to achieve since causality and predictability are very hard to infer from just company specific sales and inventory data.

Referring to FIG. 1, a table showing advertisement expenditures between 1999-2001 is illustrated. As shown, companies spend marketing dollars across a range of different mediums, both nationally and locally. This activity is designed to build awareness, induce prospects to buy and build greater loyalty in existing customers. Yet, for each marginal dollar spent, companies do not know if they have spent money on the best medium, in the right setting (local or national), directed towards the right customers, whether prospects or repeat buyers. Thus, a company does not truly know if their advertising efforts are effective.

Presently, companies measure media effectiveness by awareness, which is loosely correlated with bottom line profits and loss impact. Companies measure impact through changes in attitudes, which are also loosely correlated with actual purchase intent and behavior, and therefore, bottom line profits and loss impact. Companies measure results from a lift in sales but with little ability to understand whether a customer's behavior is really changing over time. The inability to measure a customer's behavior over time and tie consumers' behavior to marketing makes it difficult to determine the optimal marketing mix choice of product, price, positioning, and packaging.

With marketing budgets reaching into the tens of millions for some companies, this lack of clarity is a major problem. Even with a measurable medium, such as, local, store-specific and product specific offers, which is fairly easy to measure, companies can measure response but have a hard time understanding what is really driving consumer behavior and therefore, the real bottom line impact of the dollars spent. Also, while companies measure response to a specific promotion, e.g., a coupon, they cannot determine if the coupon itself induced a purchase or what it means for the next time a similar purchase occasion arises for a customer.

Marketing is just one part of a company's expenses that is tied to its bottom line. Merchandising, operations, customer service are all part of the offering that a company makes to its customers and prospects. In addition to media expenditure, companies commit hundreds of billions of dollars to investments in branding, marketing research, product development, distribution planning and site location, prospecting and acquiring customers. Each is a significant activity but similar uncertainty as to the effectiveness of decisions made with respect to these areas exists. Information is the critical ingredient needed to make accurate and knowledgeable decisions in all these areas. Any information and analysis that better informs a company such that it can make a more accurate and correct decision along any of its activities is extremely valuable. Most important is real-time detailed information that allows a company to measure and therefore better predict consumer behavior, relative to the market, in response to specific changes in its offerings.

Given that market information can inform all types of decision making, there are five specific information areas that define a company's need: performance tracking, media tracking and effectiveness, product assortment and pricing management, location/market optimization, and consumer needs and insight.

Performance tracking encompasses all measures of an organization's financial efficiency and return on investment. Depending on the financial model of the organization, focus may be on indicators of a firm's profit path (net profit/net sales) or turnover path (return on assets as the product of inventory turn and net profit). Different areas of an organization track additional indicators of growth and productivity. For example, marketing efforts would most directly be assessed in terms of sales or share growth and the return on the expenses associated with the marketing activities. The key financial data include net sales, gross margin or profit, expenses, net profit, assets, liabilities, inventory turnover rate, etc. Market data used in financial performance indices are sales volume and share of sales.

Media tracking and effectiveness determine the impact of advertising and other promotional vehicles on sales and financial productivity. Typically, impact on sales volume is measured indirectly and imprecisely via consumer survey research conducted with target consumers. The studies are designed to measure brand and advertising awareness, as well as perceived image of and propensity to purchase the promoted product. Measures are taken before, after or daily to allow comparisons of when advertising is on-air and when it is not in terms of claimed brand awareness and purchase. If these key metrics show increases, the promotional activity is considered to have been effective. These qualitative measures are tracked in parallel with hard sales and share data to provide some degree of confirmation that the survey data moved in the same pattern as sales. If data is available, sales and shifts in sales volume are tracked within key consumer target group segments identified in the marketing objectives.

Media effectiveness and media mix modeling currently used at major packaged goods manufacturers and some large retailers attempt to determine a more direct linkage of marketing and promotional activity to top line growth. Additionally, the specific mix of promotions (e.g. TV, coupons, national newspapers, local distribution of flyers, etc.) is assessed in terms of each promotion's respective contribution to topline performance. Multiple regression analyses are conducted to determine which media provided the best return on investment. Typically, more of an effective or efficient media would subsequently be purchased and the analysis repeated to continue to optimize the mix. Data used in market mix modeling includes market inputs, i.e. the type of promotion and media (advertising, coupons, flyers, billboards) and the media weights by time frame (nationally or regionally depending on data available and the location of the business itself). The analysis uses "output" measures of sales volume and share as the key revenue indicators.

The goal of managing product assortment and price is delivering "the right products at the right price" to fulfill consumer need while simultaneously meeting the company's financial goals. Selecting and/or developing products requires knowledge of consumers and how they interact with the category. Consumer attitude and trend surveys, focus groups, and test market studies are common means of obtaining this understanding. Specifically, knowledge of the product's life cycle, whether fad, fashion or staple, is important to forecasting sales. Indicators of demand (sales and share) go into tracking return on assets or investment to plan and evaluate performance. Sales are forecast by taking into account historical sales volume, economic trends and customer information such as reaction to the product prior to launch and test market results to help predict consumer acceptance.

Ensuring consumer demand for products requires determining which products to offer which typically entails segmenting consumers of a company's products into groups whose needs are similar and devising products and services to meet those sets of needs. Product development and market forecasting research help to reduce the risk of failure. Additionally, tracking trends and understanding the life cycle of a particular category is necessary to drive product development and selection to assure future demand. Determining pricing strategies and setting optimal price points is also critical for ensuring demand. For packaged goods and other products with longer lifecycles, identifying the optimal price point begins with exploratory research to understand the trade-off between volume (lower price) and margin (higher price) as well as overall fit with brand and product quality image. In-store tests are also conducted as a more reliable means of setting price.

In an effort to offer the right products at the right price, many retailers engage in the process of category management, which seeks to optimize the sales and profits of a category. This is accomplished by understanding how consumers shop a category, e.g. what requirements are they seeking to fulfill on any given shopping trip, what they consider to be the competitive set and how they make purchase decisions, what else they buy in the same visit, etc. For example, knowing that all parents go grocery shopping with their young children has led cereal manufacturers and retailers to place the child-targeted brands on the lower shelf where kids can see them (and demand their purchase).

Deciding in which geographic markets to enter or expand is a critical area for manufacturers, retailers and service providers alike. Companies with retail locations must also select trade areas and specific store sites that will generate customers while being consistent with the retail strategy. The location decision is critical because of the attendant high costs and long-term commitment to establishing a retail presence. For this reason, companies devote considerable resources and budget to obtaining information that will allow them to accurately identify a good site and reduce the risk of failure or sub-optimal performance in that market.

Information used in market and location decision-making typically involves first identifying the characteristics of a product's target group and/or the drivers of a successful store, then locating the regions, trading areas and sites that provide access to a concentration of that segment of the population. The selection criteria vary according to the product category and retail strategy but are commonly a combination of socio-demographic and geographic characteristics. For example, a retailer may target upscale female shoppers, and the brand positioning and store format have proved to be most successful in 'main street' type locations. Selecting a site would entail identifying sites that fit the physical and geographic criteria in high-income towns. On the other hand, if the big box retailer is opening a "destination" site, extreme proximity to target consumers would be less important than would easy access to highways and ample parking.

The information used in market and location optimization includes socio-demographic characteristics of the target group and population, such as, location of current or prospective customers, physical characteristics of a site such as traffic patterns, parking, business climate and regulations that could affect construction, hiring practices, identification, location of competitors, consumer spending on the category, and population and economic outlook to help forecast future demand.

Producing and distributing products and services for consumers necessitates identifying and satisfying consumer needs better than the competition. Obtaining an understanding of how and why consumers make purchase decisions, the attitudes they have toward companies and the challenges consumers face everyday are central to all aspects of product development and distribution, branding, marketing, and customer satisfaction.

Obtaining consumer insights typically involves studies with large samples of consumers to capture attitudes, lifestyle characteristics and product usage via one-time consumer surveys or on-going panels. Many of these studies are proprietary research custom-designed to provide understanding on a specific category, brand or general attitudes.

This need for market information has not gone unnoticed. As a result, an entire industry has grown up around consumer companies to help articulate and target marketing messages and measure their effectiveness, based on the best available market information, as well as to help make the right decisions on the other major activities. However, the current market information that is available still does not adequately serve the needs of players in the consumer market space due to the difficulties in gathering it. Market information is a critical business need in the consumer market today. It is also a business need that spans industry segments, the value chain of an industry and within a company, different types and levels of users. For any industry segment, the value chain comprises three types of players who are consumer focused, who while working together, need to use market information from their own perspective. The three players are manufacturers, retailers and advertising and media agencies.

Manufacturers who build products but sell them through retailers need market information to determine how well their product is doing in the market and how best to create the right incentives to make consumers purchase it. They also need market information to understand how to change their products over time. The difficulty facing manufacturers is that they do not interact directly with consumers creating a knowledge gap about market information that needs to be filled.

Retailers interact with consumers on an ongoing basis since consumers are the core component of their business. Since how they interact, who they interact with, and what they are offering are the critical components of their business, their need for market information is even greater. The local nature of each chain store, the local geo-demographic differences in the customer base between stores, and the variations in competition, means retailers also need site-specific market information. In addition, since retailers interact with consumers frequently, ongoing real-time market information to measure how frequent changes in marketing mix effect behavior is needed.

Retailers suffer from not being able to track and know how a customer that walks out of their store really behaves. Has the customer visited before? How often? Where else does the customer go for similar products? What is driving them to choose to purchase at one store vs. the other? Answers to these types of questions impact all aspects of retail operations, from marketing and promotions, to merchandising, to site location and design. Yet, outside of store specific loyalty and charge cards, which are two avenues retailers use to gain some insight into customer behavior, retailers have little to base these decisions on except for changes in sales. Even loyalty and charge cards suffer from the problem of being retailer specific and do not inform the retailer on where else customers go and what else they buy from other retailers.

Advertising and media agencies are responsible for creating the marketing collateral used by manufacturers and retailers to better target and sell to their customers and potential prospects. For these companies, the ability to measure the effectiveness of marketing and better intelligence about customer buying behavior are extremely relevant as they form a critical component of selling their services to their clients. However, measuring media effectiveness has also proven to be one of the major problems facing the advertising industry today.

As discussed earlier, market information is valuable to marketers and other functional users within a company since it has the potential to impact all types of decisions. Using department store retail as an example, market information that informs on site selection and performance is relevant to the operations function within a retail company, whereas market information that informs on marketing effectiveness is relevant to the marketing function. This means that multiple different functional users exist within a company, each with their own set of decisions that need to be made.

At the same time, these types of decisions are made at different levels within a company with strategic decisions being made by corporate management, operational decisions being made by managers and tactical decisions being made by analysts and junior managers. At each level, the type and nature of interaction with market information is different. Thus, a system needs to cater to these intra-company differences in the user base. Within each of the above industries, sectors and corporate functions, tools for a range of job responsibilities need to be offered. A system needs to support activities for the more tactical analyst and manager and also support the more strategically focused activities of senior management.

Referring to FIG. 2, a block diagram of an exemplary retail organizational structure is illustrated. Top executives, or an executive committee, charged with setting the strategic direction for the entire company and ensuring financial productivity, are supported by a Corporate level division that takes care of strategic planning, real estate and market planning (including site location), finance and systems. The strategy is implemented and the business managed by three tactical divisions: merchandise management, marketing, and store management. Merchandise management procures product assortments and sets prices that consistent with the overall strategy. Marketing is responsible for driving consumer traffic and sales. Store management is responsible for all store-related activity, including staff productivity, expense control, human resources (HR), and store appearance.

Market data and insights are used throughout the organization, but the type of application and level of detail varies depending on the function and level. For example, the strategic planning group supports senior management at the corporate level to determine the strategy and business mission that will cascade down throughout the organization. Strategic planners answer questions such as: what business are we in; what should our business be in the future; who are our customers; what are our capabilities; and what do we want to accomplish. Strategic planners synthesize a wide cross-section of information from financial performance data, consumer and demographic trends to key learning from all divisions to determine the future direction of the company.

Also within the corporate function is the real estate group responsible for determining the regions and markets in which to expand and add stores. This group selects the store sites using a combination of geo-demographic data and information on traffic patterns, accessibility, and availability of parking.

The information used by the merchandise management division is quite different. This group is primarily concerned with procuring and estimating demand for products, and setting price points. Their use of information is focused on deciding what items in what color and in what quantities to order. Past performance and consumer trends would inform their decisions. They also have input into where to place merchandise in the store. Insights into consumer shopping behavior are used to make decisions such as placing kids' clothing next to house wares because women shop for house wares and often these shoppers have children for whom they buy clothes on impulse.

Store managers are concerned with very different issues again, such as individual store design and layout, visual merchandising and customer service quality. Store managers are also charged with controlling costs and managing employees. Store managers use sales and expense data and probably are able to access selected consumer insights or trending information as it relates to store layout and design.

SUMMARY OF THE INVENTION

Given the types of decisions being made that require market information, the types of players and users of the information, the two main characteristics of best-in-class market information are the quantity of data and the quality of data. The quantity characteristic of the data allows for accuracy, timeliness and coverage for granularity of data. The quality of the data deals with the inter-connectivity of the data. Here, the trend (or historical read over time), the merchant share (among competitors) and the buyer profile (at a very small segment level) are the main drivers. Therefore a successful, best-in-class information and market insights business has the following key value drivers: accuracy of information, granularity of information, timeliness of information, historical time-series availability, merchant share information, and buyer profiling.

The information needs to be accurate and projectable, so it can be used to make real business decisions. The information needs to be granular enough to allow tracking of specific changes in offerings and marketing mix at a local level for effective measurement of impact. For ongoing operational and tactical decision making, the timeliness of the information becomes critical. Understanding the impact of a particular marketing strategy and decisions on how to proceed requires as close to real-time information as possible. To understand lasting behavioral change created by changes in offerings and marketing mix on customer behavior, the information has to allow tracking of consumer behavior over time. To allow real decisions based on relative performance measures, the information has to allow a user to contrast their performance, customer base, usage, etc., to a relevant competitive set at a national, regional and local level. To understand "who" is buying and interacting with a company, the information has to allow for very small, localized customer segment analytics to gain meaningful insight into how to optimize local marketing mix and media activities.

There are many types of participants in the information industry that not only capture market information but also provide analytical expertise to help companies with their decision-making processes. Broadly speaking there are four categories of players: primary information providers, secondary information provider, analytic tool providers, and consulting firms.

Primary information providers which create consumer market information using a variety of methods from panels and surveys to sourcing it directly from participating merchants. Secondary information providers collect geo-demographic information on customers from public sources that companies use to append to their own customer databases, or from primary information providers. Analytic tool providers which integrate multiple types of information, create analytic frameworks, data manipulation tools and optimization models, for companies to use with their databases. Consulting firms which mostly specialize in a particular industry and expertise, provide consulting based help to companies with their decision-making processes.

From these information providers, companies have several different types of market information that they can buy access to—behavioral, attitudinal, and geo-demographic segmentation data. In all cases, companies use this information to better understand and segment their customer base and prospects, and to infer causality between changes made to their marketing mix and product offerings and performance. While companies do the best they can do with the best available market information, they still fall far short of reaching the goal of being able to accurately predict consumer response and buying behavior.

With multiple sources of information in the market, there is little ability to join them together due to the inability to match customers and behaviors. That is why consumer companies still engage in customized surveys of 2000-5000 people to try and collect rich multidimensional information. However, these surveys are prohibitively expensive to do continuously, and suffer from small sample size issues that make them all but useless for any detailed analysis of the customer base across different locations and over time.

Primary information providers try to generate the best available market information on consumers as they compete for marketing research dollars. There are two main business models that are used. The first one gathers customer behavior and attitudinal data through surveys and panels that track this information with a sample of customers over time. The second business model gathers transactional detail from merchants who choose to participate. In this model, the participating companies self-report information and can use the collected information for their analyses and planning purposes.

Even the best available market information today is gathered utilizing methods that are of their very nature, error prone and imprecise. A first shortcoming is lack of granularity and accuracy. Survey and panel information suffers from small sample size and therefore is not granular enough to allow actionable tactical and operational decisions accurately at a local level. At the same time, panel information, which pays customers for their information suffers from potential selection bias as well. The projection of this data is based on extrapolating results to the US population based on demographics and therefore makes little to no allowance for individual preference.

Data that is gathered through cooperative model or point of sale (POS) feeds is dependent upon companies' willingness to participate. If participants decide to pull out, the data is left incomplete. Without these participants, the usefulness of the information to measure relative market share and changes in customer behavior has greatly decreased.

Another shortcoming of the market information available today is the lack of real time data and lack of time-series data for each customer. Surveys are conducted roughly once every quarter and it is difficult to associate them in order to produce an ongoing look at customer behavior. Data from cooperatives does not typically capture customer specific information and therefore cannot be used to understand buying behavior and how it evolves over time.

Another shortcoming of the market information is the disconnect between customer information and transaction data—the inability to answer, "who's buying what and where." Even in the packaged goods industry where detailed SKU level information and competitive data is widely available, companies are only able to link purchase behavior and customer set based on surveys of a small number of people. As a result, even with comprehensive purchasing data and complex modeling tools, marketers can only take a "push" approach by controlling variables such as price and distribution, but are not able to "pull" by targeting the right customer segment and stimulate their demand.

While many players produce market information on customer buying behavior, they all fall short of the key data-based value drivers identified earlier for a successful market information business. Accordingly, embodiments of the present invention utilize card-holder transaction data to address these problems.

The number of card-holder transactions that are executed per year is huge, with the number of daily transaction also being quite large. Thus, in one embodiment of the present invention, access is provided to card-holder transaction data detailing accurate-to-the-penny transaction amounts, twenty-four hour active customers, and a multi-year transaction history per customer. Furthermore, such data is captured in real-time, and due to the sample size, can provide granular, statistically significant information at a local level. In addition, card-holder transaction data also provides great merchant coverage as well.

In another embodiment of the present invention, there is provided a system for providing market insights comprising: a transaction database server that includes a transaction database and a first customer information database, wherein the transaction database configured to store at least card transaction data, the first customer information database configured to store at least customer and household information identifying card holders, and the transaction database is coupled to and interacts with the first customer information database to associate the customer and household identification information with the card transaction data; a card analytical services component that includes a plurality of reporting and analytical modules, the analytical modules providing marketing analyses based at least on the interaction between the transaction database and the first customer information database, and the reporting modules provide marketing-related reports based at least on the marketing analyses provided by the analytical modules; a panel card component configured to create a transaction questionnaire based at least on the card transaction data from the transaction database and to receive responses to the questionnaire; and a value shopper component configured to provide targeted sales programs to customers identified based at least on the marketing analyses, the marketing-related reports, the questionnaire, and the associated responses to the questionnaire.

In still another embodiment of the present invention, there is provided a method for providing market insights comprising: receiving card transaction data from purchases made with stored-value cards; receiving customer and household information identifying card holders of stored-value cards; assessing the card transaction data and the customer and household information to assign the customer and household information to the card transaction data; providing marketing analyses based at least on the assessing; providing marketing-related reports based at least on the provided marketing analyses; generating a transaction questionnaire based at least on the received card transaction data; receiving at least a response to the transaction questionnaire; and providing a targeted sales program based at least on the marketing analyses, the marketing-related reports, the questionnaire, and the at least one response to the questionnaire.

BRIEF DESCRIPTION OF THE DRAWINGS

The preferred embodiments are illustrated by way of example and not limited in the following figure(s), in which:

FIG. 1 is a table showing advertisement expenditures between 1999-2001;

DETAILED DESCRIPTION OF THE INVENTION

Reference is now made in detail to embodiments of the present invention, some examples of which are illustrated in the accompanying drawings, in which like numerals indicate like elements, showing a system and method for evaluating the cause and effect of advertising and marketing programs using card transaction data. It should be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not intended to be limiting, but are merely a basis for the claims and a representative basis for teaching one skilled in the art to variously employ the present invention.

Furthermore, elements may be recited as being "coupled." Use of this terminology contemplates elements being connected together in such a way that there may be other components interstitially located between the specified elements, and that the elements so specified may be connected in fixed or movable relation to one another. Certain components may be described as being "adjacent" to one another. In such instances, it is expected that a relationship so characterized shall be interpreted to mean that the components are located proximate to one another, but not necessarily in contact with each other. Normally, there are no components positioned between adjacent components, however this is not a requirement. Still further, some structural relationships or orientations may be designated with the word "substantially." In those cases, it is meant that the relationship or orientation is as described, with allowances for variations that do not effect the cooperation of the so described component or components.

Figure 2:
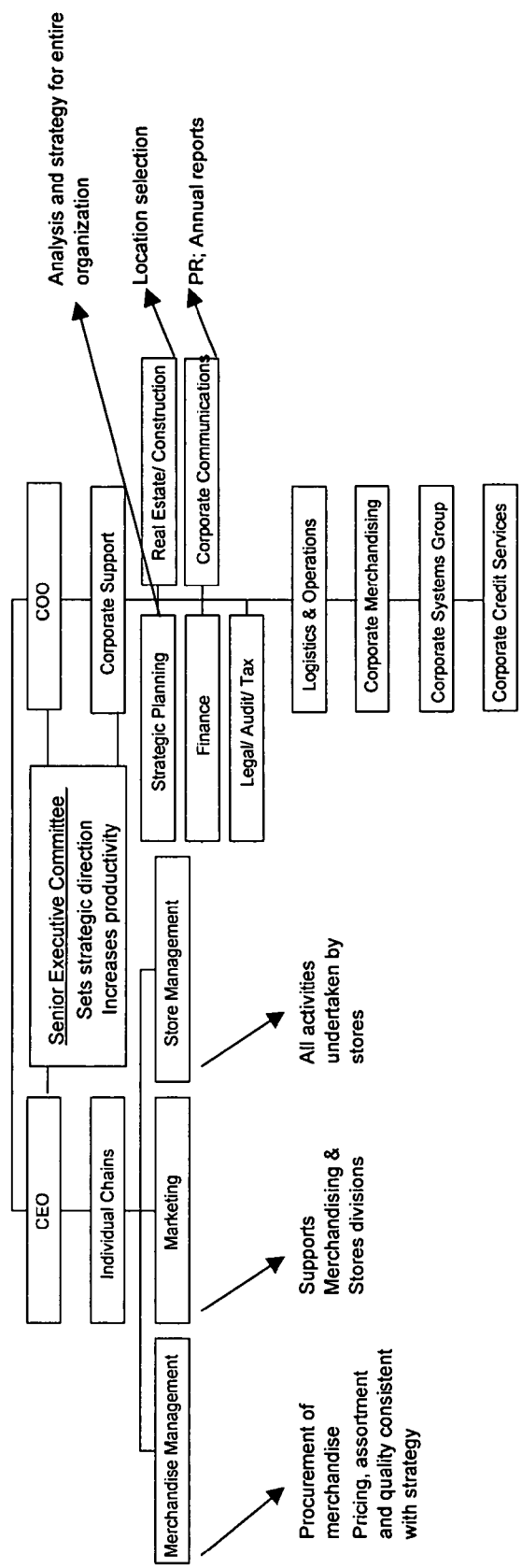
FIG. 2 is a block diagram of an exemplary retail organizational structure.
Figure 3:
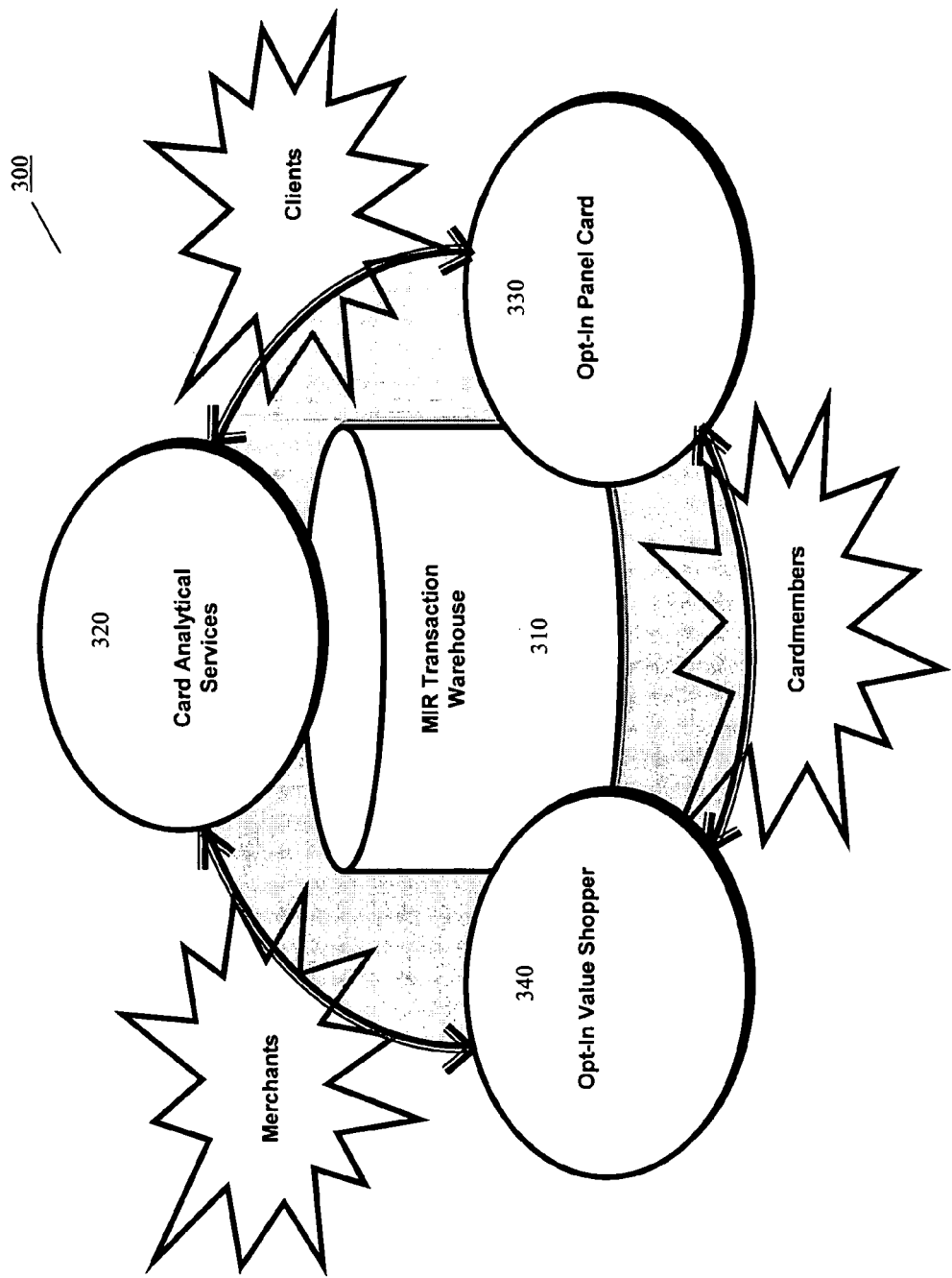
FIG. 3 is an overview of a Market Insights Resource (MIR) system in accordance with an embodiment of the present invention.

Referring to FIG. 3, an overview of a Market Insights Resource (MIR) system 300 in accordance with an exemplary embodiment of the present invention is illustrated. In the preferred embodiment, the MIR system 300 comprises the MIR transaction warehouse 310, the card analytical services 320, the panel card 330 and the value shopper 340. The MIR transaction warehouse 310 links the components 320, 330, and 340 together by providing a base set of data. The card analytical services 320 can include tools for providing insights into the consumer buying experience. The panel card 330 gathers consumer information using questionnaires. Preferably, the questionnaires are targeted, customized, event driven survey of card members who have opted-in to a relationship with the MIR system 300. The value shopper 340 is a targeted sales program enabling merchants to reach customers who have opted-in to a shopping program. Implementation of the MIR system 300 can provide benefits to clients, merchants and card members. For example, clients are provided insight to improve their decision making, profits and operational effectiveness; merchants are provided with insights to improve profits and access to participating customers; and card members are provided opportunities to earn benefits and receive offers.

The MIR system 300 is able to monitor daily purchase events and can provide such services as: benchmarking of merchant share performance, multi-year buying trend and tracking of customers, buyer behavior assessment with customer characteristics overlays, near real time reporting, accurate, factual data, granular measurements of many attributes, evaluating the sales impact of marketing programs, potential SKU and department level detail from participating merchants, etc. Using the MIR system 300, questions can be answered regarding customers, competitors, prospects, business potential, etc. Examples of customer questions include: where they live; how they live; what they watch, listen to, read; where they shop; what else they buy; where and when they travel to you, your competitors, on vacations; who they are—a full range of demographics; how they buy; what are the trends; what else they buy; etc. Examples of competitor questions include: what are their strengths; what are their weaknesses; what loyalty do they enjoy; what are their customer characteristics; what are their trends; etc. Examples of prospect questions include: how they buy; where and when they shop; what's their loyalty; what they watch, listen to, read; their willingness to travel; who they are—demographics; what are the trends, what else they buy; etc. Examples of business potential questions include: where they should grow; how they should market, advertise and manage; what you share you should have; where to pen stores and where to close stores; what to spend and how to spend; who to reward and who to develop; etc.

Figure 4:
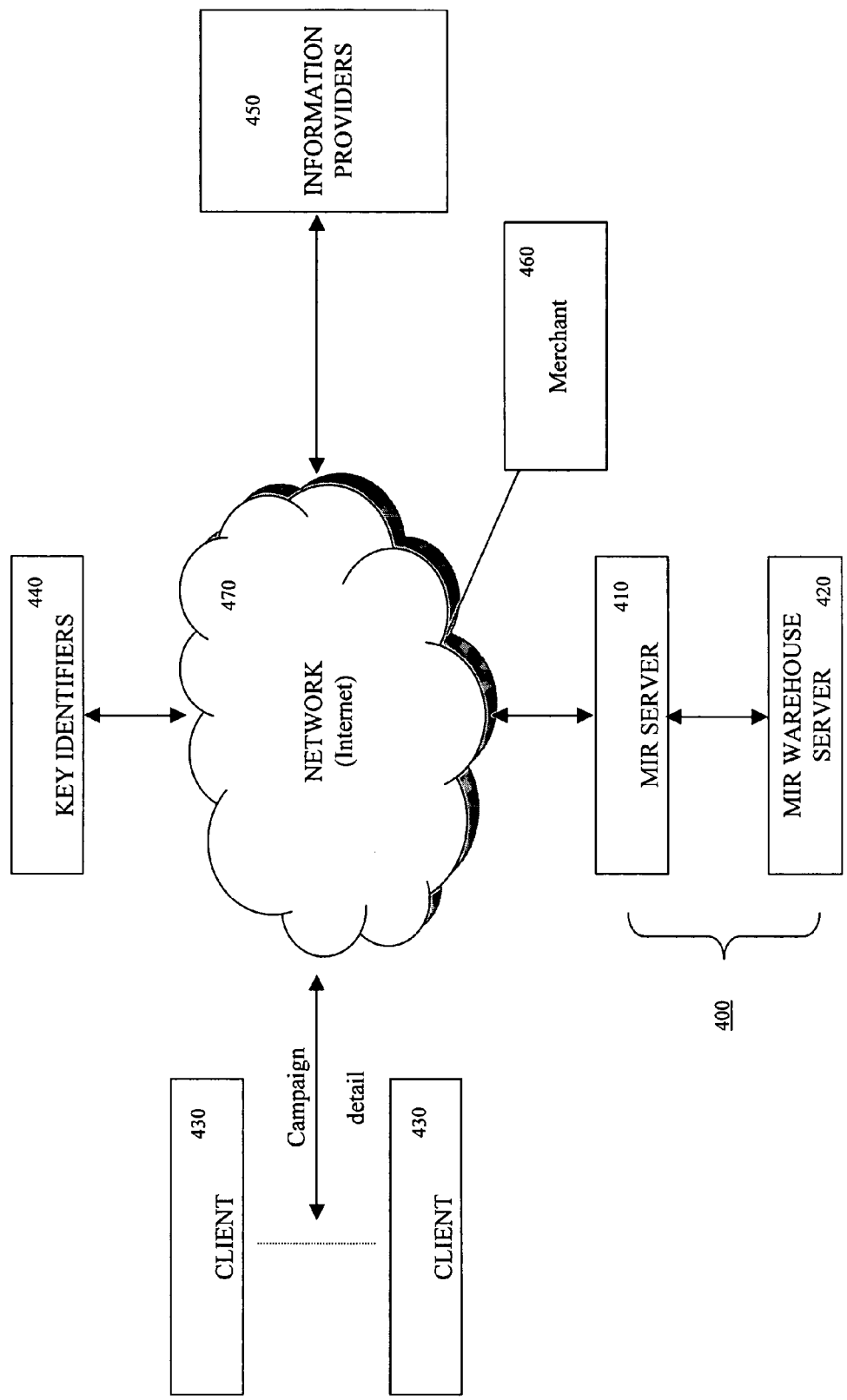
FIG. 4 is a block diagram of a MIR system in accordance with an exemplary embodiment of the present invention.

Referring to FIG. 4, a block diagram of a MIR system 300 in accordance with an exemplary embodiment of the present invention is illustrated. In the preferred embodiment shown, the MIR system 300 is implemented as a web-based system 400 residing on one or more servers/computers, specifically, a MIR server 410 and a MIR warehouse server 420. In alternate embodiments, the MIR system 300 comprises one or more software applications stored on one or more computer readable mediums (CRMs). In the embodiment shown, the MIR server 410 is coupled to the MIR warehouse server 420 and comprises the card analytical services component 320, the panel card component 330, and the value shopper component 340. The MIR warehouse server 420 represents or alternatively comprises the MIR transaction warehouse 310, which contains financial card transaction data from credit cards, debit cards, smart cards, optical cards, magnetic-stripe cards, and any other financial cards known to one skilled in the art. Thus, the MIR warehouse server 410 contains data such as the exemplary data shown in the warehouse environment 720 of FIG. 7. The MIR warehouse server 420 can include one or more databases and can reside on the MIR server 410. The MIR server 410 can communicate with one or more clients 430, one or more key identifiers 440, one or more information providers 450, and one or more merchants 460 via a network 470, e.g., the Internet.

Figure 5:
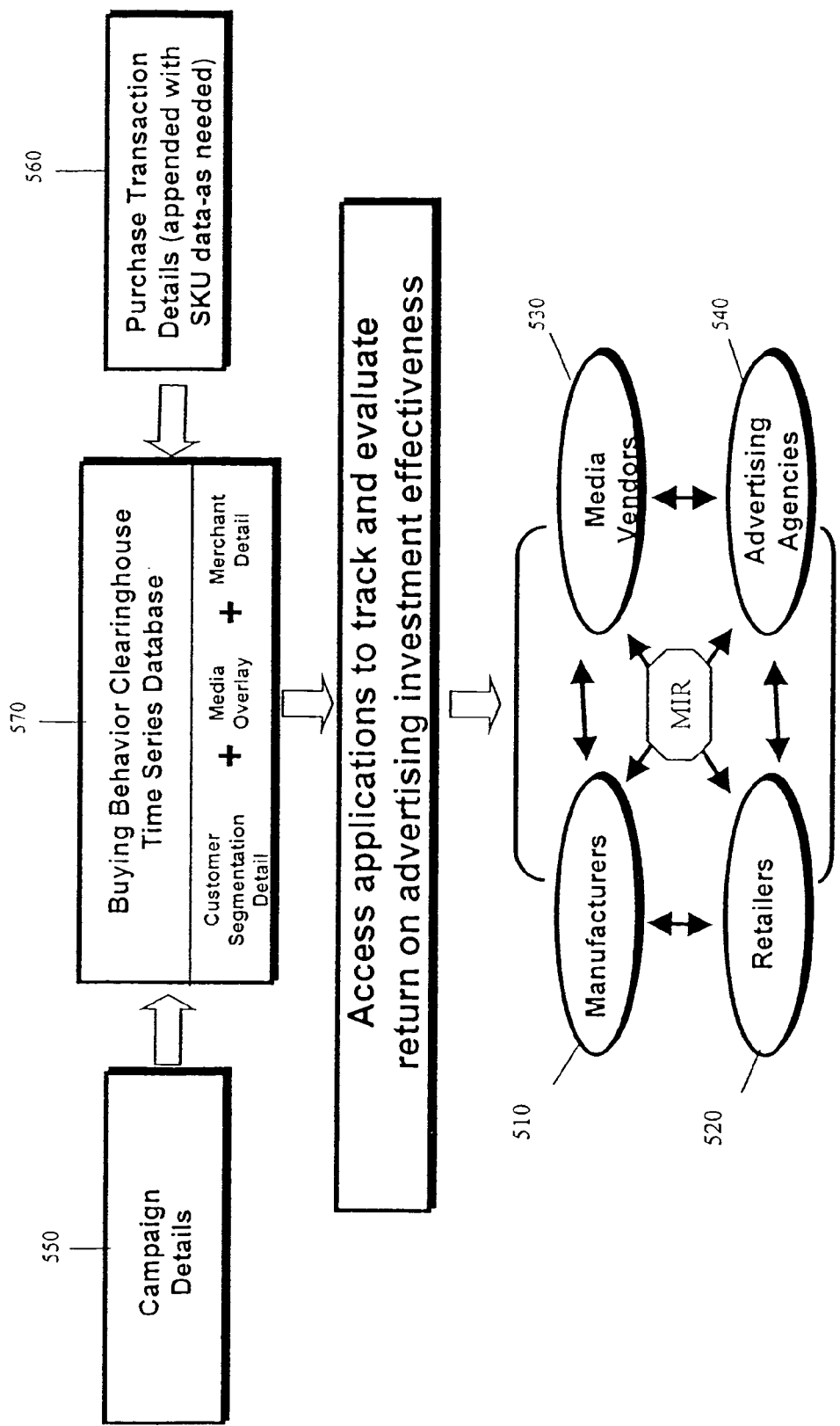
FIG. 5 is a block diagram showing the information that the MIR system uses in accordance with an exemplary embodiment of the present invention.

Referring to FIG. 5, a block diagram showing the information that the MIR system 300 uses in accordance with an exemplary embodiment of the present invention is shown. The clients 430 (FIG. 4) of the MIR system 300 can include, for example, manufacturers 510, retailers 520, media vendors 530, and advertising agencies 540, and/or any other consumer-oriented businesses. A client provides the campaign details 550 to the MIR system 300 for analysis. If needed, purchase transaction details 560 from one or more merchants can also be provided to the MIR system 300. The purchase transaction details 560 can include, e.g., appended SKU data. In the embodiment shown, the campaign details 550 and purchase transaction details 560 are put into a buying behavior clearinghouse time series database 570 residing in, e.g., the MIR warehouse server 420. As shown, the MIR system 300 uses the campaign and purchase transaction details 550, 560 in conjunction with customer segmentation detail, media overlay and merchant detail in programming applications to track and evaluate return on advertising investment effectiveness. Such programming applications can reside in the MIR server 410 (FIG. 4). Preferably, the MIR system 300 then presents the analysis to the client as one or more reports as described next.

Card Analytical Services

Figure 6:
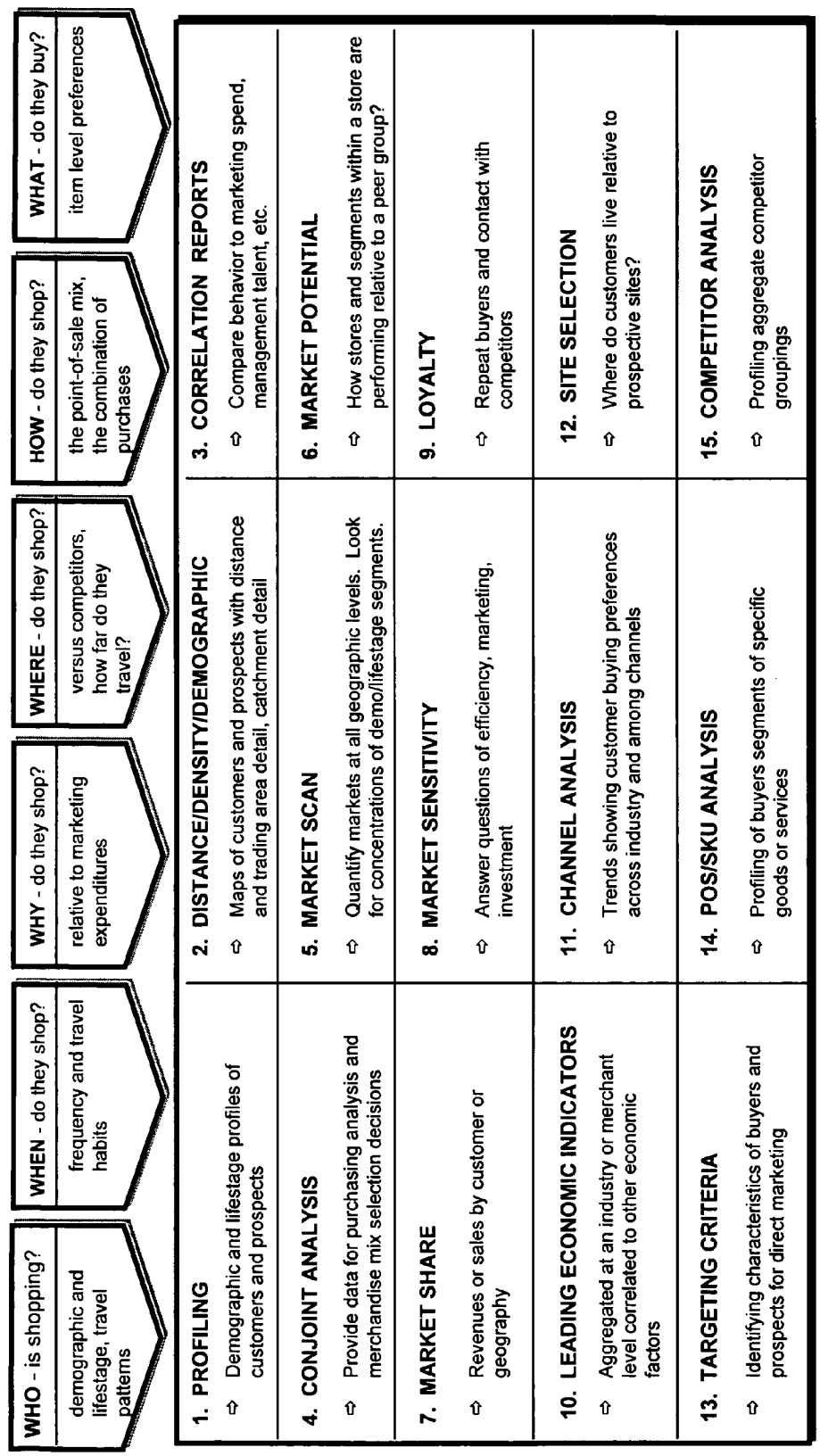
FIG. 6 is a block diagram showing multiple exemplary types of reporting and analytical capabilities that the MIR system can create; in accordance with an exemplary embodiment of the present invention.

Referring to FIG. 6, a block diagram showing multiple exemplary types of reporting and analytical capabilities that the MIR system 300 can create is illustrated. The reporting and analytical capabilities can answer a plethora of questions, such as: (a) who is shopping—demographic and lifestage, travel patterns; (b) when do they shop—frequency and travel habits; (c) why do they shop—relative to marketing expenditures; (d) where do they shop—versus competitors, how far do they travel; (e) how do they shop—the point of sale mix, the combination of purchases; and (f) what do they buy—item level preferences.

Using the analytical capabilities of the MIR system 300, the following analysis can be determined: (1) profiling—demographic and lifestage profiles of customers and prospects; (2) distance/density/demographic—maps of customers and prospects with distance and trading area detail, catchments detail; (3) correlation reports—compare behavior to marketing spending, management talent, etc.; (4) conjoint analysis—provide data for purchasing analysis and merchandise mix selection decisions; (5) market scan—quantify markets at all geographic levels, look for concentrations of demographic/lifestage segments; (6) market potential—how stores and segments within a store performing relative to a peer group; (7) market share—revenues or sales by customer or geography; (8) market sensitivity—answer questions of efficiency, marketing and investment; (9) loyalty—repeat buyers and contact with competitors; (10) leading economic indicators—aggregated at an industry or merchant level correlated to other economic factors; (11) channel analysis—trends showing customer buying preferences across industry and among channels; (12) site selection—where do customers live relative to prospective sites; (13) targeting criteria—identifying characteristics of buyers and prospects for direct marketing; (14) POS/SKU analysis—profiling of buyers segments of specific goods or services; and (15) competitor analysis—profiling aggregate competitor groupings.

Given the almost limitless questions that can potentially be answered using the data, the analytic and reporting capabilities of the MIR system 300 can build around specific application packages that target different types of uses and users within a prospective client. The reporting packages can include: campaign response package, benchmarking package, reaching customers/prospects package, customer/prospect profiling package, shopping basket package, scheduling package, and direct marketing and targeting package. Each of these reporting packages are further described below.

The campaign response package can answer such questions as: how did a campaign affect sales and market share; who bought/who did not buy; how long did the lift last; how much of the sales increase was incremental; what campaign elements were not effective; and which store locations and customer segments were most/least effected.

The benchmarking package can answer such questions as: what is the company's market share and penetration by geographic area relative to competitors; what elements are most effective in driving profits and loss results; what is the competitive picture; where else do customers shop; which customer segments are most likely to shop elsewhere; and where is the company most vulnerable to competition, by type of offering, by geography and customer segment.

The reaching customers/prospect package can answer such questions as: where do they live; how do they interact with the company's marketing messages; how often should they be contacted and in what form; what has proven to be most effective; and with which customer segment.

The customer/prospect profiling package can answer such questions as: who are the company's customers, by segment and geographic area; what are the buying patterns; what is the household composition; how price sensitive are the customers, by segment; how is the customer base changing over time, by trade area and relative to competitors; and how does the company's customer base compare to competitors.

The shopping basket package can answer such questions as: how often do the company's customers shop relative to the competition; what do customers/prospects buy, at the company's store, at the competitions stores; what is the size of the average purchase, by customer segment, and how does this compare to the competition; and how do customers react to change in product mix.

The scheduling package can answer such questions as: when do customers shop; what are their travel habits at the company's stores versus competition; and what are purchases customers tend to make in one trip but from different stores.

The direct marketing and targeting package can answer such questions as: what are customers' contact characteristics; what are their response characteristics; does their buying behavior change in the long run and how; and how does the company improve contact efficiency.

The preferred embodiment of the MIR system 300 are able to deliver these packages to different layers of a client's organization, for different types of decisions and uses. Therefore, the tools and functionality of the MIR system 300 can include multiple possible front-end reports and formats. Because preferred embodiments of the MIR system 300 include a web-based graphical user interface (GUI), the reports and formats can be customized by the user and can allow high-level queries as well as deep analysis depending on the level of interaction required. The following paragraphs describe a number of exemplary reports available through preferred embodiments of the invention.

As for reports, a report can include market sector dynamics, such as demographic profiles of their customers in terms of sex, age, presence of children, type of vehicle driven, etc. For example, a market populated primarily by affluent professionals like doctors whose incomes are shielded from recessions need not be as sensitive to changes in the national scene. The report could address shifting demographics and attitudes. For example, a market traditionally defined as "older professionals" might be undergoing a baby boom with the resultant shift towards a younger, trendier consumer. Other examples include: (a) a store that clings on to the outdated view of its market may find itself hemorrhaging customers in favor of stores that are better in touch with their market; (b) the macro economic conditions that may presage a shift in consumer or segment behavior; (c) the capital market volatility that may affect the sales of luxury or better-known brands; (d) the micro economic conditions that may lead to a localized set of purchasing behaviors that do not mimic the national scene; and (e) Some markets may be experiencing some localized business upswings pre-knowledge of which may lead a store to stock up on "impulse purchase" items.

A distance/density report can answer questions such as: how far do their customers live from their stores, how far are they willing to travel to get to a store; what is the optimal tradeoff between how far they are willing to travel and the "value" they perceive (in terms of price or some other product attribute) they are getting; how dense with the right kind of customer is the store's location; what is the "pull" of the store; and how far geographically does this extend?

Spending profiles can be generated, the profiles are reports that can answer such questions as: how much do customers spend at the stores and why; do they buy complementary goods at the same store; when a customer shops at a golf store, do they also then make a purchase at a nearby clothing store (this information may lead the golf store to expand its range of golf clothing); is the buying pattern discernable over time; does seasonality, promotions or some other form of advertising drive purchase behavior; how frequently do particular customers shop; how recently have particular customers shopped; what drives frequency and frequency of purchase;

and do local or in-store promotions or local/national advertising succeed in activating dormant or less frequent customers.

A composite competitor report can answer such questions as: how do particular stores compare to the geography within the same category (same store sales may be up, but composite competitors may be doing even better in the trade area or nationally); is performance relative to competitors driven by advertising or convenience; and is performance relative to competitors driven by the category mix within a particular store or is it driven by more local efforts such as pricing promotions or local events.

A market potential report can answer such questions as: within a market, are stores getting their fair share of target customers, given the demography and customer behavior in the market; is the store located in the right area, given the products it sells; and given potential and competition, should a retailer consider locating additional stores in the area or pulling back.

A market share report can answer such questions as: how much of a customer's wallet does a store capture; what is the potential to capture more; what drives these shares, e.g., locations, advertising and promotions, ease of shopping, store environment, customer service, store brand, price, quality, selection, availability, brands; determining whether a market is static or expanding (this defines the difference between growth coming at the expense of the competition ("stealing share") or "broadening the category."

A market sensitivity report can answer such questions as: how sensitive is the market to changes in the environment; and what are these changes.

A loyalty report can answer such questions as: how loyal are a store's customer to that store; are they not loyal to the store buy continue buying in the category at the competition; are customers generally loyal to the same store in the market but not to a few particular ones (some stores may not realize that their main categories may be meeting with fierce competition in the market which leads customers to either experience more choices or to simply get a better price. For example, an eye care chain may not realize that local supermarkets and convenience stores that are stocking up on frames and lens solutions have captured the category. They may need to market their main categories better or change their value proposition); what drives loyalty; existence of a rewards program; does the return on investment (ROI) of the program pay for itself and what do customers in the market value (younger markets may place more value on price than convenience and older markets may react more negatively to degraded service than younger markets).

A channel analysis report can answer such questions as: what channels do target customers prefer; what demographics drive this preference (younger customers tend to sample and buy music online versus older customers preferring the experience of an in-store transaction); do multiple channels have synergy for particular stores; should a store go completely online or stay by its "bricks & clicks" strategy; how successful at particular channels in capturing target segments versus the competition; most major retailers are now outsourcing their Internet channels to branded online retailers like Amazon.com; what is it about their customers that made them prefer shopping at Amazon.com and not at the stores online channel; how do customers allocate their discretionary spending over multiple channels like the Internet and in-store purchases; do consumer makes their first purchase at a store (to "touch" the product) and subsequent ones through direct channels like the phone or the Internet; how much does channel' conflict cost a particular store or a national chain; is channel conflict good; do stores lose their customer to their own channels or to the competition (the answer to this question can drive large investment decisions); is channel conflict necessary; and losing customers to your own channels simply means that you've met a latent consumer need, however, is the expense necessary (the answer can be gleaned by consumer behavior at competing stores where there is more channel choice).

Preferred embodiments of the MIR system 300 are able to integrate with other information sources—both third party and client specific—in order to form a full picture of the retail purchasing environment and to properly deliver against the reporting packages and analytic tools described above. To build attitudinal, awareness, and geo-demographic detail on customers, the MIR system 300 can integrate the transaction data with relevant third-party data. The MIR system 300 can pull in specific data sets from the client to append to the MIR's transactional and customer data, e.g., the SKU can be appended to the transaction data. In one embodiment, there are at least 12 fundamental data building blocks that underlie the preferred embodiments of the MIR offerings to fully enable the relevant tools to be used as shown in FIG. 7.

Figure 7:
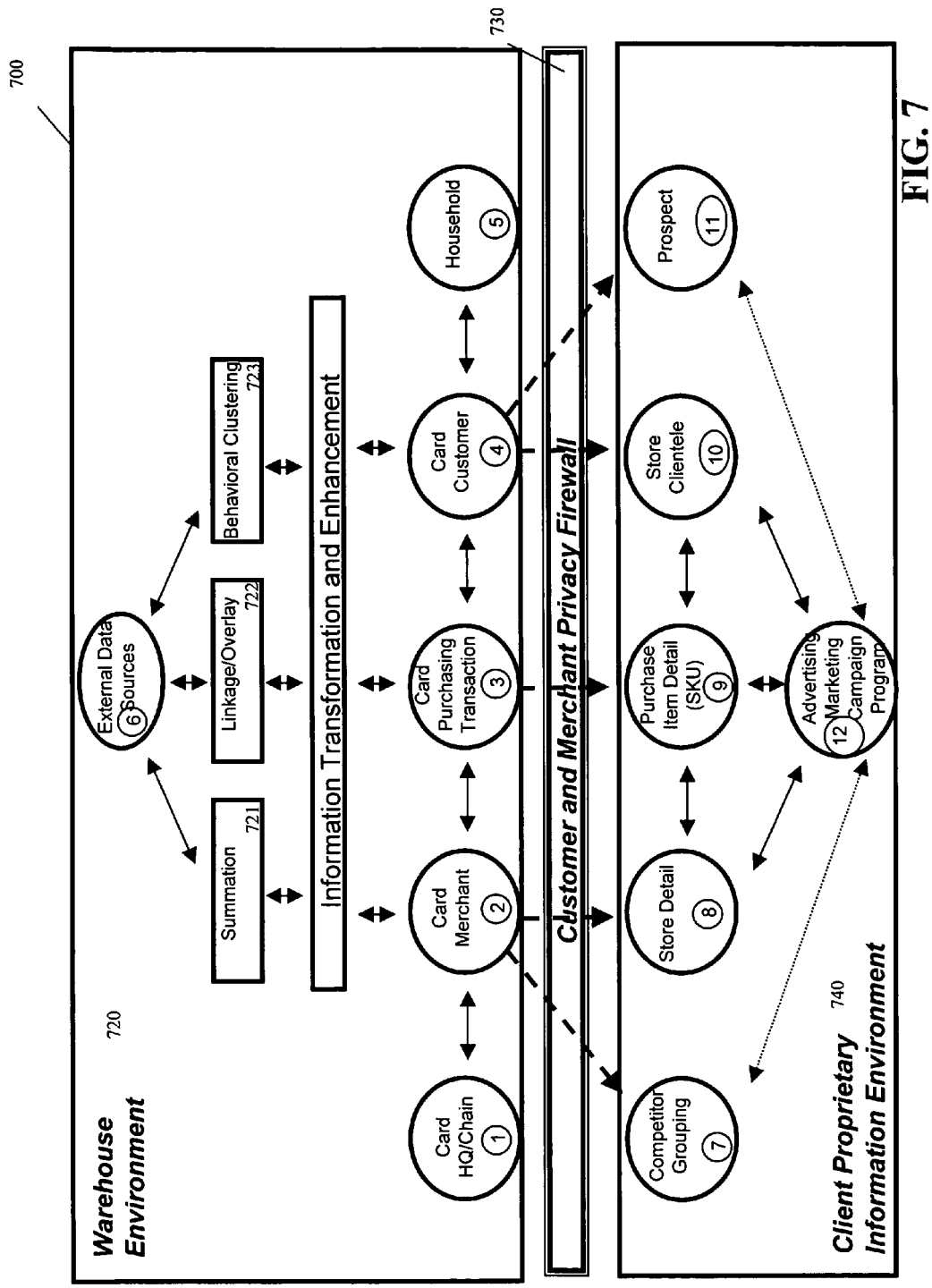
FIG. 7 is a block diagram of a data architecture that enables the different sources to be integrated in accordance with an exemplary embodiment of the present invention.

Referring to FIG. 7, a block diagram of a data architecture 700 that enables the different sources to be integrated in accordance with an exemplary embodiment of the present invention is illustrated. By combining consumer, merchant and campaign information, the MIR system 300 can measure a wide range of buying behaviors. In the embodiment shown, the data structure 700 comprises two environments, the MIR activity warehouse environment 720 of the MIR warehouse server 420 (FIG. 4) and the client proprietary information environment 740. The MIR activity warehouse environment 720 includes data sources from the card/headquarters chain (numbered 1), card merchant (numbered 2), card purchase transaction (numbered 3), card customer (numbered 4), household data sources (numbered 5) and external data sources (numbered 6). The data sources (numbered 1-6) can be stored in the MIR warehouse server 420 (FIG. 4). The client proprietary information environment 740 includes data sources from competitor grouping (numbered 7), store details (numbered 8), purchase item detail, e.g. SKU (numbered 9), store clientele (numbered 10), prospect (numbered 11), and advertising market campaign programs (numbered 12). A customer and merchant firewall 730 separates the warehouse environment 720 and the client proprietary information environment 740.

The warehouse environment 720 connects the various transaction data sources (numbered 1-5), which are proprietary to card issuer company and made available to the MIR system 300, to demographic and other publicly available data sources (external data sources, numbered 6). As mentioned earlier, the transaction data sources can be from various different financial cards, such as credit cards, debit cards, smart cards, optical cards, magnetic-stripe cards, and any other financial cards known to one skilled in the art. In one embodiment of the present invention, an information transformation and enhancement process takes the proprietary transaction data sources (numbered 1-5) and connects them so that transformation and enhancement of the data can take place. Enhancement of the data is done through external data sources (numbered 6) that provide demographic, and other customer information that are appended to the proprietary data sources.

The information transformation and enhancement process can be implemented by a programming application residing in the MIR server 410 (FIG. 4). It comprises the following three processes: summation 721, linkage/overlay 722, and behavioral clustering 723. These three processes refer to how external data is appended to the proprietary data sources. The summation process 721 refers to creating summary tables from the detailed transaction data where transactional detail on individual customers is summarized to create a dataset that can be used to append external data. The summation process 721 is further described later in at least Process 1.1.

External data that is customer specific is appended through the linkage/overlay process 722. This refers to finding specific information in the proprietary data for a particular customer that is also available in the external data sources (for example name and address) and which therefore can provide a common element to append the data sets together. The linkage/overlay process 722 is further described later in at least Processes 1.2, 1.3, and 1.8.

Other, non-customer specific external data can be appended to the proprietary data by the behavioral clustering process 723. This refers to the statistical process of creating clusters of like customers along several relevant data elements and linking external data about a similar cluster available from third parties. As shown, there are several points where connections to other data sources are made. For any client specific data, neither customer-specific information nor competitive merchant-specific information can be used to integrate data. Transactional product specific information can be matched to specific card holder transaction data as shown. The behavioral clustering process 723 is further described later in at least Processes 1.5 to 1.8. Any customer specific information or purchase specific information can be pulled from the client proprietary information environment 740 using a key as described below with reference to the various data sources (numbered 1-12).

Referring still to FIG. 7, the card/headquarters chain data (numbered 1) can include data relating to the M/C key (M/C refers to a merchant code that defines which industry segment the merchant is in, e.g. hotel, department store, apparel store, electronics, etc), name, and links.

The card merchant data (numbered 2) can include the name, city, state, zip code, latitude and longitude, M/C key of the merchant and additional links.

The card purchase transaction data (numbered 3) can include the purchase amounts for each transaction, the currency, the date or the purchase and the mode.

The card customer data (numbered 4) can include an individual identification key, e.g., an Abilitec key, the latitude and longitude values, the geo code, account details for each customer and links.

The card household data (numbered 5) can include the household identification key, e.g., an Abilitec key, the latitude and longitudinal values, the geo code for each household and links.

The external data sources (numbered 6) include data from external data sources, provided by companies such as Acxiom, Claritas, Simmons, AC Nielsen, etc.

The competitor data (numbered 7) can include a selection of merchants that are competitors.

The store detail data (numbered 8) can include size, history, leadership, promotion, etc. of the client.

The purchase item details (numbered 9) can include the SKU, price and point of sale identification. This data corresponds to the purchase transaction details 560 in FIG. 5.

The store clientele data (numbered 10) can include private label experience, frequent shopper information, etc.

The prospect data (numbered 11) can include individual identification key, e.g., an Abilitec key, the latitude and longitude values, the geo code, and account details for each customer and links.

The campaign program data (numbered 12) can include media events, retail promotions, management strategy, etc. This data corresponds to the campaign details 550 in FIG. 5.

Figure 8:
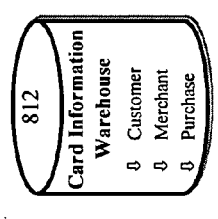
FIG. 8 is a block diagram of a data architecture for a component of the business architecture for the MIR system in accordance with an exemplary embodiment of the present invention.

Referring to FIG. 8, a block diagram of a business architecture 800 for the MIR system 300 according to an exemplary embodiment of the present invention is illustrated. The overall architecture 800 can be described as having three levels: an information management layer 810, user interface environment tools 820, and management decision tools 830. The information management layer 810 deals with the construction of the base product set of the MIR system 300. It includes the manipulation of the MIR data assets, leading to the basic extract, transformation and load processes of a standard data/information warehouse build. Thus, in one embodiment, the information management layer 810 includes value added capabilities 811, card information warehouse/database 812 and purchase transaction database 813. Examples of the value added capabilities 811 include modeling, inference mining, overlays, summarize and cluster capabilities. These capabilities can be provided by programming applications residing in the MIR server 410 (FIG. 4). The card information database 812 can include data relating to the customer, merchant and purchase. The purchase transaction database 813 can include data relating to the store, clientele, competition inventory and campaigns. The databases 812 and 813 can reside in the MIR warehouse server 420 (FIG. 4).

The user interface environment tools 820 deal with the placement of a product set into a real client-side business environment. By placing the MIR capability set into the context of the BAU (Business As Usual) processes of a client, the MIR system 300 is able to be fined tuned to the needs of a client. Thus, in one embodiment, the user interface environment tools 820 can include analytic precision 821, benchmark comparisons 822, business opportunities 823 and cause and effect assessment 824. The tools 820 can reside as one or more programming applications in the MIR server 410 (FIG. 4).

The analytic precision 821 is based on how much data is provided to the MIR system 300 and how much data the MIR system 300 requires to provide statistically significant samples. The benchmark comparisons 822 can include such choices as SIC (Standard Industrial Classification) based category spend data, customer segment (for example, Personicx segments (a product of Acxiom Corporation), geography/trading area, merchant, outlet, SKU, etc. The benchmark comparisons 822 can be based on a variety of factors such as geography, population verse local share of wallet, etc. The business opportunities 823 are opportunities in which clients may want to capitalize on, such as pricing opportunities, promotions, placement or re-stocking opportunities for hot selling categories, site selection, advertising, etc. The business opportunities 823 include the reporting interval, e.g., daily, weekly, monthly, etc. The cause and effect assessment 824 provides the efficacy of a particular marketing message such as media mix optimization, local verse national media placements, pricing/compensation, location, campaign, etc.

The management decision tools 830 allow for the examination of high-level business concerns. One aspect includes the ability to drill-down from the high level information into the increasing levels of detail that will take the client into the user interface environment tools 820 as desired or needed. The tools can reside as one or more programming applications or drivers in the MIR server 410 (FIG. 4). In one embodiment, there are four main applications/drivers: enterprise drivers 831, store level drivers 832, operational drivers 833, and product/merchant drivers 834. The enterprise drivers 831 can include testing, business modeling, in depth analysis, what if scenarios, cluster analysis, data mining, etc. The store level drivers 832 can include location, size of store, price positioning, promotions, local advertising, inventory, etc. The operational drivers 833 can include campaign management, SKU-detail appending, performance tracking, and JIT (Just In Time) techniques. The product/merchant drivers 834 can include warranty, display, quality, pricing, bundling, and trends.

The business architecture 800 is able to handle large-scale database environments of hundreds of millions of customer records; accommodates real-time transactional needs; enables integration of operational and information systems to synchronize business functions around the customer; provides linkage to individual customer information from multiple data sources for specific marketing applications; simplifies and expedites updates and maintenance processes for data warehousing; and enables a single, accurate view of the customer across all enterprise touch-points.

In a preferred embodiment, the MIR system 300 allows customer-specific information or merchant-specific information to be accessible by one or more non-card issuer company entities. In preferred embodiments, information flowing from the MIR databases to the client and vice versa is protected through encryption and decryption on both sides. Coupled with the use of keys, such information is meaningless if access is not authorized. The safeguarding of customer- and merchant-specific information from the client is facilitated through the use of a firewall. A firewall in both the process sense and a physical sense is constructed to safeguard the primacy and privacy of card member identities and merchants specific information. Such firewall is shown in FIG. 7 as firewall 730 and further described next with reference to FIG. 9.

Figure 9:
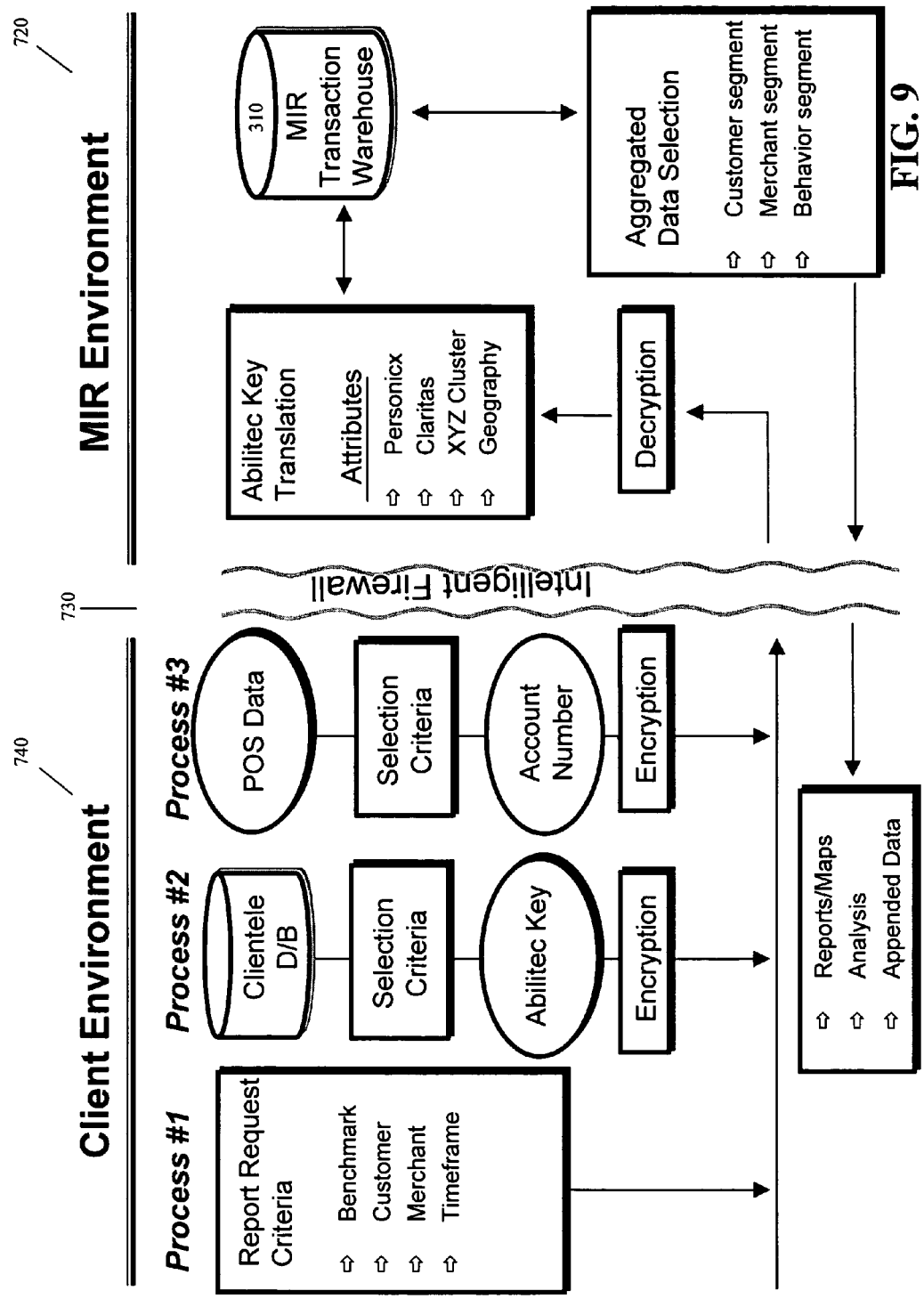
FIG. 9 is a block diagram of a firewall privacy protection methodology in accordance with an exemplary embodiment of the present invention.

Referring to FIG. 9, a block diagram of a firewall privacy protection system in accordance with an exemplary embodiment of the present invention is illustrated. As shown, a firewall 730 separates the client environment 740 and the MIR environment 730. In a preferred embodiment, the MIR transaction warehouse 310 does not contain consumer names or addresses. Each consumer and household has an identifying key associated with it, such as an AbiliTec key. An AbiliTec key is a commercially available, numerical national identification key for all US names and addresses and phone numbers provided by the Acxiom Corporation. The key masks individual identity and provides links that facilitate enterprise-wide instantaneous customer data integration. Consumer personal detail should never be individually shared or revealed. The identification key allows clients access to the customer transaction data without knowing who the customer is and where they are. Any consumer specific information is contained within the card issuer company's MIR firewall 730 where it can be used to attach geo-demographic attributes to a clients query.

The MIR transaction warehouse 310 contains merchant names and addresses, and specific merchant data can only be revealed with permission of the merchant. Otherwise it can be aggregated with other merchants so as to shield the specifics from ever leaving the card issuer company's firewall. If a merchant client 430 (FIG. 4) wants to compare its results to the competition, several merchants are selected with each merchant having less than a certain percentage of the total marketplace. For example, at least four merchants would be selected with each having no more than 35% share of the total marketplace. In this way, there is no way a client can see specific competitors information.

The three processes #1, #2, and #3 shown in FIG. 9 describe alternative embodiments in which a client 430 can interact with the MIR data and architecture of the MIR system 300. A description of each process shows how the identification key system, in conjunction with the protection of MIR merchant specific information, allows all of the functionality and offerings envisioned for the MIR without compromising consumer or merchant privacy.

Process #1: Depending on the reporting or analytic task, report request criteria is passed across the firewall. The report request criteria can include benchmark, customer, merchant and timeframe information. The relevant consumer information is aggregated into small statistical clusters in the aggregated data selection process. The resulting dataset is then passed back across the firewall to the client.

Process #2: A client may wish to append MIR information to a group of clientele. For the selection criteria, the identification key for a customer is identified and encrypted and passed across the firewall. The identification key is then de-encrypted and used to help select a set of customers having related attributes (e.g. geography, Personicx segment). Personicx is a household-level (HH) segmentation system that places each US household into one of 70 segments based on that HH's specific consumer and demographic characteristics. For example, Personicx allows marketers to see the dramatic difference between the consumer behaviors of the affluent retiring couple right next door to the young family just starting out, and tailor their marketing programs appropriately. These attributes are then be matched to the MIR transaction warehouse 310 and the relevant customer set is selected. The buying behaviors of this aggregated set can be computed and returned across the firewall. In other words, when the merchant sends over the key, the customer is identified for internal purposes but what goes back is couched in segment or "birds of a feather" terms.

Process #3: A client could analyze point of sale (POS) SKU-level buyer segments by passing an encrypted version of the sixteen digit card holder number across the firewall. The MIR environment can de-encrypt the account number and can then link the account number to an identification key and determine to which attributes segments the customer belongs. As in Process #2, these attributes are then matched to the MIR transaction warehouse and the relevant customer set is selected. The buying behaviors of the aggregated set is computed and returned across the firewall. In other words, when the merchant sends over the key, the customer is be identified by the MIR system 300 for internal purposes but what goes back is couched in segment or "birds of a feather" terms.

MIR Transaction Warehouse

This section details the process by which the MIR transaction warehouse 310 can be created from the raw transaction data and the processes involved in making the data ready for use by the aforementioned front-end MIR applications residing in the MIR server 410. This section also covers some ways of extending the transaction warehouse 310 to capture consumer panel type information, specifically through a Panel Card concept.

As discussed above, the MIR concept can include the transaction data that is captured whenever a card issuer customer does a transaction on a card. However, before this data can be used by the MIR applications, it needs to be prepared for use (all relevant information added), balanced to accurately represent overall consumer distribution (to remove biases in the customer base), and then scaled up to represent relevant consumer spending. In addition, industry-specific biases need to be accounted for. Creating the MIR transaction warehouse 310 can require several datasets to be used to append relevant customer and merchant information to the raw transaction data in order to allow the front-end MIR applications to address the critical needs for market insights discussed above. The data preparation is described next.

Figure 10:
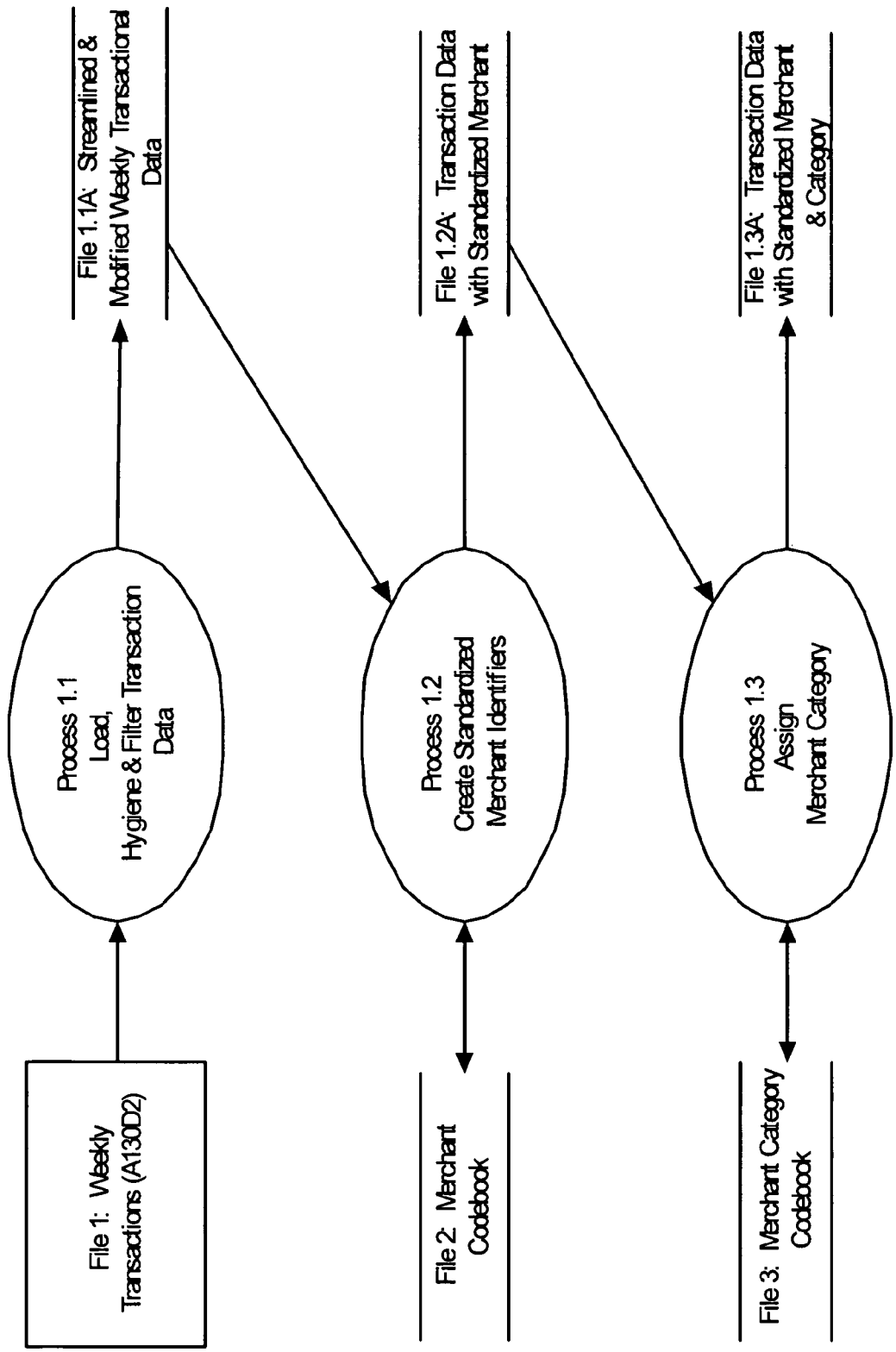
FIG. 10 is an exemplary flowchart of a method for creating the MIR transaction warehouse 310 in accordance with an embodiment of the present invention.

Referring to FIG. 10, an exemplary flowchart of a method for creating the MIR transaction warehouse 310 in accordance with an embodiment of the present invention is illustrated. Creating the MIR transaction warehouse 310 involves cleaning the data and creating the relevant code books to ensure that merchant information (name, location, etc) are accurately captured. The method begins with Process 1.1, wherein the raw input data of periodic card transactions (File 1) is loaded from a database (e.g., the card information database 812 shown in FIG. 8) and cleaned to remove any inaccuracies in the raw weekly transaction data. In a preferred embodiment, the periodic data is entered on a weekly basis, however one skilled in the art recognizes that data can be entered using a variety of periodic and/or other basis for entering the data, e.g., every transaction, after a set number of transactions, etc. Overall, Process 1.1 filters the inbound records to applicable accounts and transaction types, standardizes data attributes, and limits the number of outbound attributes to the variables being used by the MIR system 300, its applications, and ad-hoc support.

Process 1.1 includes the following steps:
1. Read input data from the periodic transaction file (File 1), e.g., a file containing the transaction records (each record for a card transaction) for a period of time.
2. Filter the input data based on predetermined filtering business rules. For example, only records with certain record code values are retained, and records containing account numbers starting with "0000" are dropped. One skilled in the art could use other known filtering rules. If necessary, data transformations are performed using look-up tables to convert data formats. For instance, to correct Y2K problems, the following look-up table can be used to convert the inbound one position century code (C) to an outbound two-digit century code (CC). Thus, sales data attribute (CMMDDYY) is

| Inbound Century (C) | Outbound Century (CC) |
|---|---|
| "0" | "19" |
| "1" | "20" | converted to a standard Oracle data format (MMDDYYYY).
3. Convert the POS (Point of Sale) entry mode to a standard MIR channel code.
4. Retain the following attributes for subsequent processing (dropping all other data attributes): record code, account number, MCC (Merchant Classification Code), sale data, amount, merchant (bin number), merchant zip, merchant location (state), POS entry mode, and merchant description field. And
5. Store the resulting streamlined and modified weekly transaction record in File 1.1A.

In Process 1.2, the merchant codes are standardized using a Merchant Codebook file (File 2) which uniquely identifies a merchant. Process 1.2 includes the following steps:
1. Create a unique standardized merchant key in a Merchant Codebook file (File 2) for each merchant based upon the name of store, store number, merchant city, merchant state.
2. Assign a merchant zip code to each standardized merchant key in File 2, whenever the merchant zip is not provided, for each merchant.
3. Build merchant-match variables for looking up merchants to include: name of store, store number, merchant city and merchant state from the merchant description field.
4. Look up the merchant for each card transaction in File 2 to obtain the standardized merchant key.
5. Look up the merchant for each card transaction in File 2 to obtain the standardized merchant key.
6. Append the standardized merchant key, e.g., the standardized merchant name, store number city, state, and zip code data, to the transaction record in File 1.1A. And
7. Store the appended transaction records in File 1.2A, which now includes transaction data with standardized merchant. The following exemplary table is produced by Process 1.2.

| Transaction Type | Entry Found in Merchant Codebook | Action Required |
|---|---|---|
| Visa | Yes | None |
| Visa | No | Add to Merchant codebook |
| M/C | Yes | Assign zip code from codebook |
| M/C | No | Report in Exception File |

In Process 1.3, the transaction File 1.2A is sorted by the account number, preferably in ascending order, and a merchant category is assigned to the merchant for each card transaction in File 1.2A. Process 1.3 includes the following steps:
1. Look up the proprietary classification code in the Merchant Category Codebook file (File 3) using the merchant standardized key (obtained from Process 1.2 above), record code, and MCC code (the record code and MCC code are retained in Process 1.1). File 3 is created based on industry classifications.
2. Append the looked-up merchant category codes to File 1.2A so that each merchant for each card transaction is assigned to a market segment (e.g. department store, retail, etc).
3. Store the appended transactions records in File or database 1.3A, which now includes transaction data with standardized merchant and merchant category. The database/File 1.3A is then used in the balancing and scaling processes (to be described later). The following exemplary table is produced as a result of Process 1.3:

| Entry Found in Merchant Classification Codebook | Action Required |
|---|---|
| Yes | Assign proprietary classification code to record |
| No | Report in Exception File Add to codebook |

Figure 11:
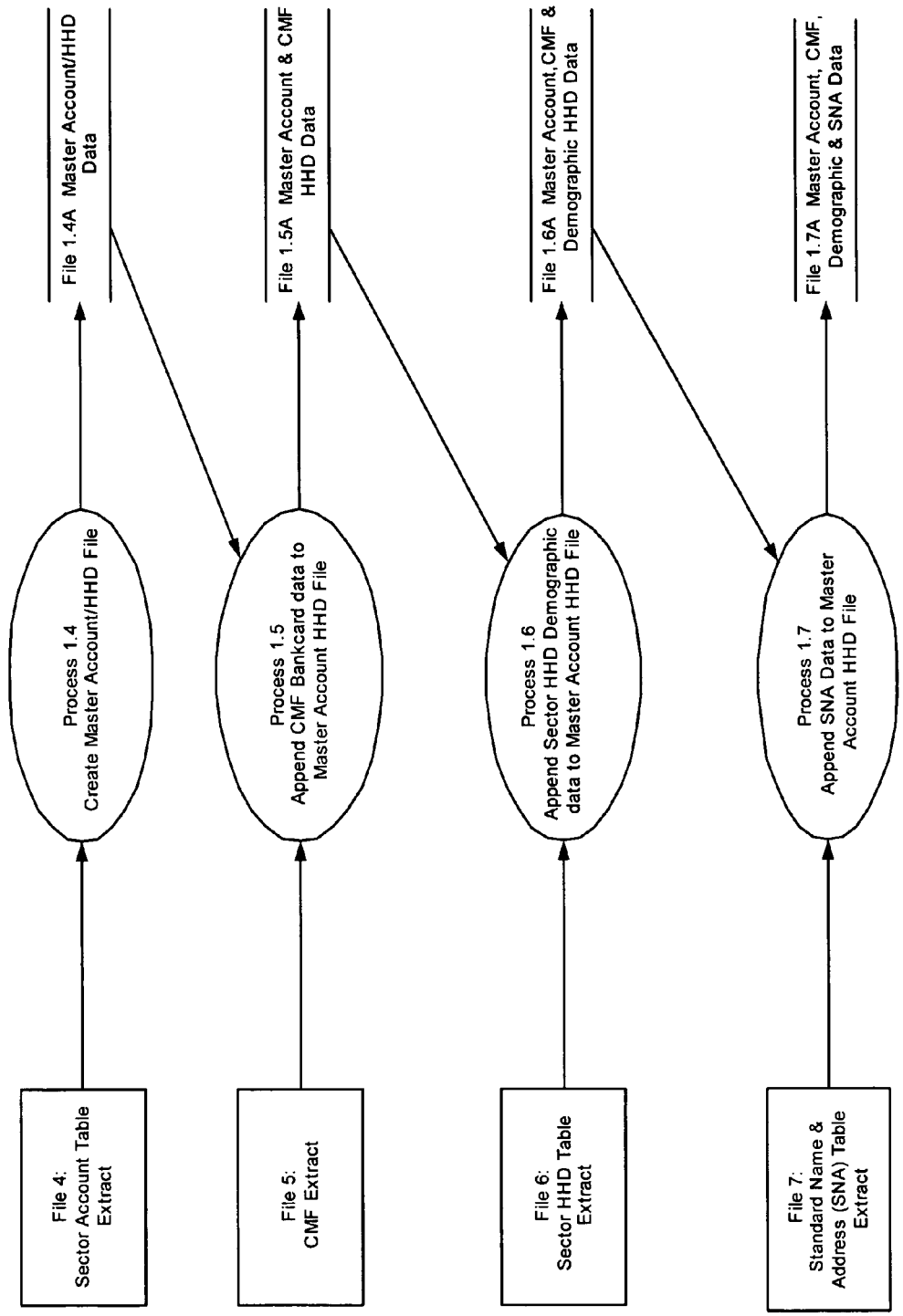
FIG. 11 is an exemplary flowchart of a method for adding customer information to the transactional file in accordance with an embodiment of the present invention.

The raw transaction data that is cleaned and prepared in the processes in FIG. 10, as described above, does not contain customer-specific information except for the card used in making each card transaction. Referring to FIG. 11, an exemplary flowchart of a method for adding customer-specific information to File 1.3A in accordance with an embodiment of the present invention is illustrated. The method is used to create a master customer information file or database (File 1.7A) that contains relevant customer specific information. Files 4, 5, 6 and 7 are extracted from one or more databases proprietary to the card issuer company which together are used to create File 1.7A. Such proprietary databases are known in the art and not further described herein. In the method shown, there are four processes: 1.4, 1.5, 1.6, and 1.7. These processes are described below.

Process 1.4 uses File 4 to create a metadata table that identifies all households that hold a card and ties each card to a HHD ID. The table is then filled with HHD data for a master account of each customer, and the master-account file of each customer is saved in File 1.4A. This provides the key link to the transaction data in File 1.3A. The following is an exemplary metadata table produced as a result of Process 1.4:

| Field | Start | End | Length | Format |
|---|---|---|---|---|
| HH Number | 1 | 10 | 10 | Numeric |
| Customer Number | 11 | 20 | 10 | Numeric |
| Acct. Seq. Number | 21 | 30 | 10 | Numeric |
| Acct. Number | 31 | 48 | 18 | Character |
| Data Source Code | 49 | 52 | 4 | Character |
| Standard Business Code | 53 | 54 | 2 | Numeric |
| CCIS Service Code | 55 | 56 | 2 | Numeric |
| Acct. Purge Ind. | 57 | 57 | 1 | Character |
| Acct. Sub Type | 58 | 58 | 1 | Character |
| Emp. Ind | 59 | 59 | 1 | Character |
| Stat Major Code | 60 | 60 | 1 | Character |

In Process 1.5, using the account number, card holder specific data attributes are extracted from a File 5 in one of the card issuer company's proprietary databases for each customer and appended to the master account HHD File 1.4A to form File 1.5A.

In Process 1.6, select household information (HHD zip code, location, DMA (Direct Marketing Area), select demographics, etc.) is extracted from a File 6 in another proprietary database of the card issuer company with household level information and appended to File 1.5A to form File 1.6A.

In Process 1.7, standardized customer name and address information is extracted from another proprietary database of the card issuer company and appended to File 1.6A along with an encrypted name key or Abilitec key to form the master customer database or File 1.7A. The following exemplary table is produced as a result of Processes 1.5, 1.6 and 1.7:

| Field | Start | End | Length | Format |
|---|---|---|---|---|
| HH Number | 1 | 10 | 10 | Numeric |
| Customer Number | 11 | 20 | 10 | Numeric |
| Acct. Seq. Number | 21 | 30 | 10 | Numeric |
| Acct. Number | 31 | 48 | 18 | Character |
| Data Source Code | 49 | 52 | 4 | Character |
| Standard Business Code | 53 | 54 | 2 | Numeric |
| CCIS Service Code | 55 | 56 | 2 | Numeric |
| Acct. Purge Ind. | 57 | 57 | 1 | Character |
| Acct. Sub Type | 58 | 58 | 1 | Character |
| Emp. Imp. | 59 | 59 | 1 | Character |
| Stat Major Code | 60 | 60 | 1 | Character |
| Account Specific Data . . . | | | | |
| HH Demographics . . . | | | | |
| Census Data . . . | | | | |
| AbiliTec Link | | | | |
| Standard Name & Address Data | | | | |
| Balancing weight | | | | |
| Penetration Factor | | | | |

As a result of Processes 1.1 to 1.7, the two files or databases used by the MIR system 300 and retained in the MIR transaction warehouse 310 are created. One is a transaction database/file (File 1.3A), the other a customer information database/file (File 1.7A). Because both databases contain card numbers, the databases can correlate and interact with one another. Also, all other relevant customer information (demographic variables, and segments) can now be added.

Figure 12:
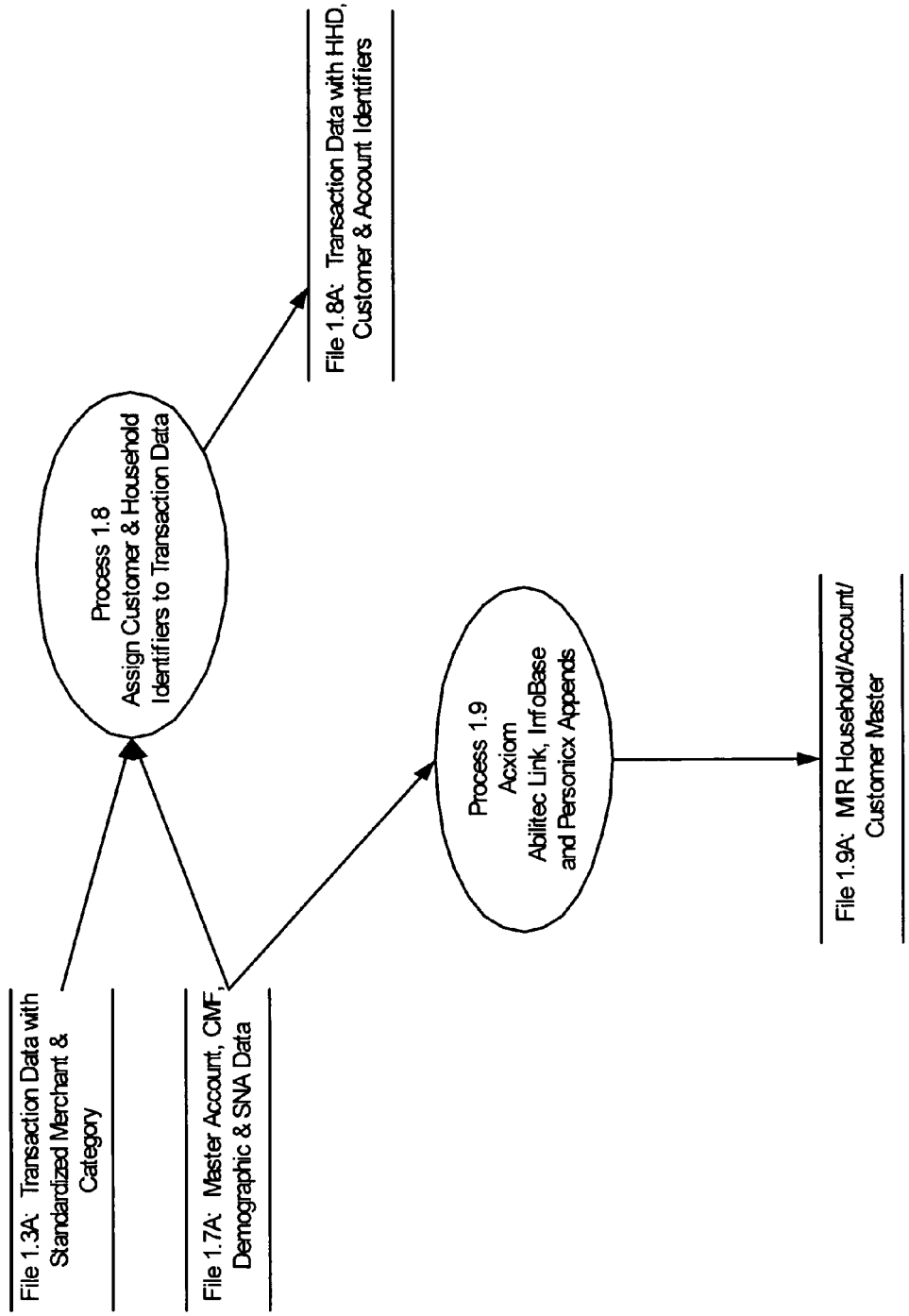
FIG. 12 is an exemplary flowchart of a method for adding customer and household identifiers to the transactional file and appending detailed segmentation and demographic information to the customer information database in accordance with an embodiment of the present invention.

Referring to FIG. 12, an exemplary flowchart of a method for adding customer and household identifiers to the transaction file/database (File 1.3A) and appending detailed segmentation and demographic information to the customer information file/database (File 1.7A) in accordance with an embodiment of the present invention is illustrated. Process 1.8 uses the input files 1.3A and 1.7A to assign customer and household identifiers to the transaction data based on the card account number on each transaction. This creates the master transaction file or database (File 1.8A) that is used in the balancing and scaling processes (to be described below). Process 1.9 uses customer information databases from companies, such as InfoBase and Personicx to append segments and other demographic variables not present in the internal databases to the customer information database, File 1.7A, to form database or File 1.9A. This is done using an encrypted name key, e.g., an Abilitec key link that was described above. The Master household, account and customer database or File 1.9A, referred herein as the MIR's customer database, is also used in the balancing and scaling processes as described next.

Balancing and Scaling

The next activity is to balance the database, e.g., making the transaction data in File 1.8A representative of the general population distribution. As noted earlier, the card issuer's customers are a skewed sample of the population. Therefore, a weight can be assigned to each customer/household in File 1.9A (the MIR's customer database). In order to calculate these weights, the customer distribution has to be compared to an overall consumer distribution. Then, a weight is assigned based on whether the representation is over or under a particular customer segment. For example, a weight is assigned to each of the customers/households in a segment to make their transactions count less than those customers that are in a segment that is underrepresented.

The following example shows how these weights can be calculated. Table 1 show by geographic segments, how card holders are distributed based on education levels. This is then compared to how the population (using InfoBase) is distributed by geographic segment by education level (Table 2).

TABLE 1

Card holder Distribution

Card Issuer Customer Distribution
InfoBase Demo (Ex Education)

| Geo: DMA1 | a | | b | | c | | d | | e | | Total | |
|---|---|---|---|---|---|---|---|---|---|---|---|---|
| Segment | HHs | % | HHs | % | HHs | % | HHs | % | HHs | % | HHs | % |
| 1 | 20 | 1.00% | 100 | 2.00% | 200 | 3.00% | 400 | 4.00% | 300 | 5.00% | 1,020 | 15.00% |
| 2 | 5 | 0.60% | 3 | 0.40% | 8 | 1.00% | 49 | 6.00% | 33 | 4.00% | 816 | 12.00% |
| . | | | | | | | | | | | | |
| 70 | | | | | | | | | | | | |
| Marginal | 340 | 5% | 340 | 5% | 1360 | 20% | 2040 | 30% | 2720 | 40% | 6,800 | 100% |

TABLE 2

InfoBase Credit Card Household Distribution

Infobase Geo Distribution - Credit card HHs)
Infobase Demo (Ex Education)

| Geo: DMA1 | a | | b | | C | | d | | e | | Total | |
|---|---|---|---|---|---|---|---|---|---|---|---|---|
| Segment 1 | HHs | % | HHs | % | HHs | % | HHs | % | HHs | % | HHs | % |
| 1 | 1,000 | 1.00% | 2,000 | 2.00% | 1,000 | 1.00% | 2,000 | 2.00% | 3,000 | 3.00% | 9,000 | 9% |
| 2 | 3,000 | 3.00% | 2,000 | 2.00% | 1,000 | 1.00% | 4,000 | 4.00% | 4,000 | 4.00% | 100,000 | 14% |
| . | | | | | | | | | | | | |
| 70 | | | | | | | | | | | | |
| Marginal | 10,000 | 10.00% | 10,000 | 10.00% | 20,000 | 20.00% | 30,000 | 30.00% | 30,000 | 30.00% | 100,000 | 100% |

Table 3 shows how for each cell, the right weights are calculated. For example, for cell 2a, the card holder distribution has 0.6% of customers in that cell (Table 1), the population distribution has 3%. Therefore the weight assigned to each card holder in cell 2b is 5 (3/0.6). Also, the penetration factor is 600 (3000/5). This is used in the scaling process that is covered in the next section. That is, each card holder in segment 2b is equivalent to 600 consumers. These two factors are then assigned to each customer/household in File 1.9A and are used to balance (and scale) the transaction data.

Figure 13:
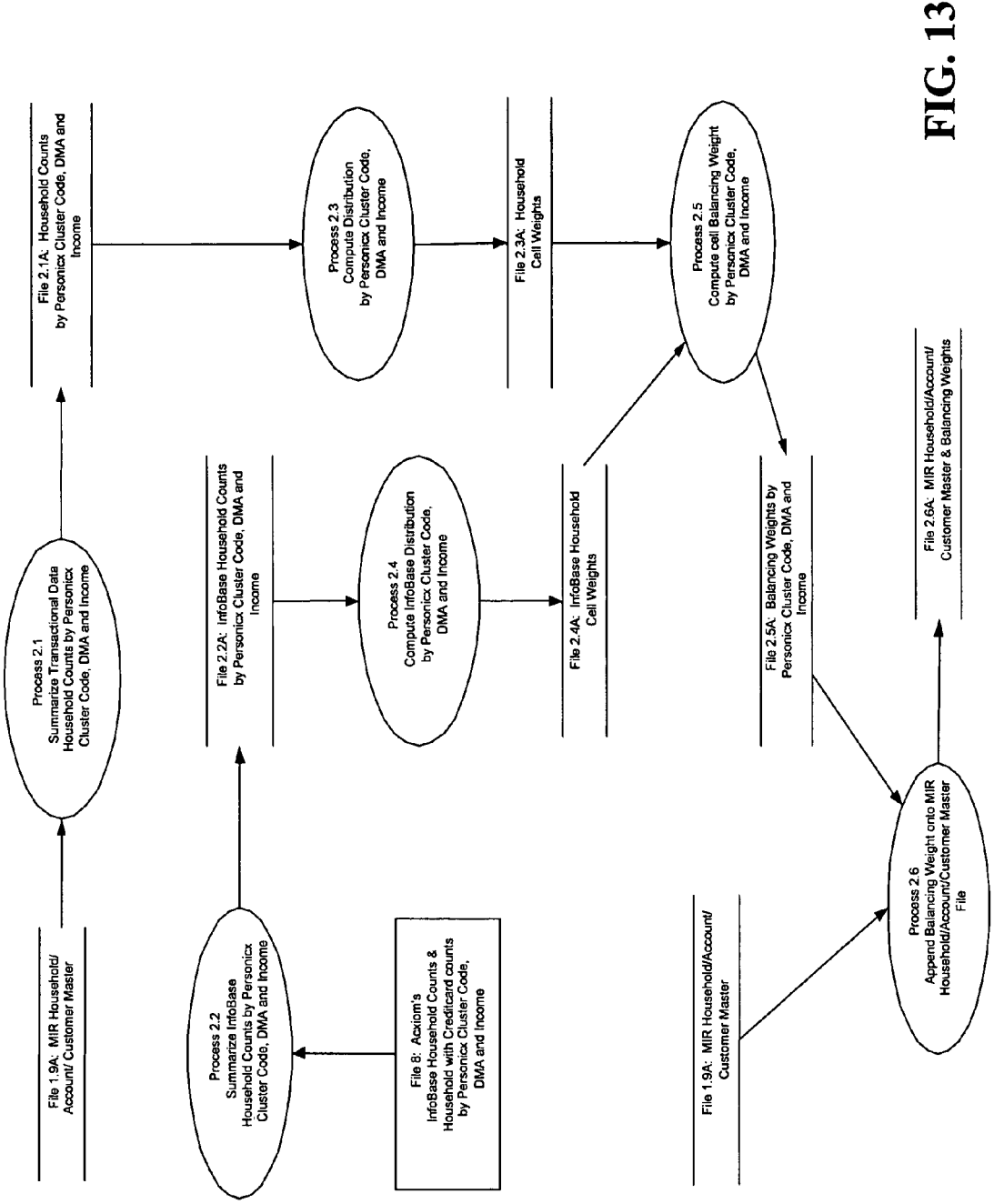
FIG. 13 is an exemplary flowchart of a method for determining the weighting factors in accordance with an embodiment of the present invention.

Referring to FIG. 13, an exemplary flowchart of a method for determining the weighting factors in accordance with an embodiment of the present invention is illustrated. Using File 1.9A (the MIR customer database) and a file derived from Acxiom's InfoBase and Personicx databases (File 8), Processes 2.1 and 2.2 create two files that give the counts of customers/households in each segment. Specifically, Process 2.1 summarizes the number of transactions households using Personicx cluster code, DMA (Direct Marketing Area) and income. A transactional file Personicx, DMA and income

TABLE 3

Balancing & Penetration Factors

Weight to be applied to Card Issuer Customer HH
Infobase Demo
(Ex Education)

| | a | | b | | c | | d | | e | | Total | |
|---|---|---|---|---|---|---|---|---|---|---|---|---|
| | Penetration | | Penetration | | Penetration | | Penetration | | | | | |
| Segment | Penetration Factor | Balancing Weight | Penetration Factor | Balancing Weight | Penetration Factor | Balancing Weight | Penetration Factor | Balancing Weight | Penetration Factor | Balancing Weight | Penetration Factor | Balancing Weight |
| 1 | 50.00 | 1.00 | 20.00 | 1.00 | 5.00 | 0.33 | 5.00 | 0.50 | 10.00 | 0.60 | 8.82 | 0.60 |
| 2 | 600.00 | 5.00 | 666.67 | 5.00 | 125.00 | 1.00 | 81.63 | 0.67 | 121.21 | 1.00 | 122.55 | 1.17 |
| . | | | | | | | | | | | | |
| 70 | | | | | | | | | | | | |
| Marginal | 29.41 | 2.00 | 29.41 | 2.00 | 14.71 | 1.00 | 14.71 | 1.00 | 11.03 | 0.75 | 14.71 | 1.00 | summary file or database (File 2.1A) is created and contains the following attributes: DMA, Personicx cluster code, income, and number of households. Specifically, Process 2.2 summarizes the number of InfoBase Households by Personicx cluster code, DMA and income. An InfoBase households by Personicx cluster code, DMA and income summary file or database (File 2.2A) is created and contains the following attributes: DMA, Personicx cluster code, income, and number of households.

Processes 2.3 and 2.4 compute the distribution (percentages) shown in the above example (Tables 1 and 2) for each cell. Specifically, Process 2.3 computes the cell percentage which equals the households in a cell (for DMA, Personicx cluster and income ranges) divided by the total households in DMA. A transactional household cell weights file or database (File 2.3A) is created and contains the following attributes: DMA, Personicx cluster code, income, number of households, and cell percentage. Specifically, Process 2.4 computes the InfoBase cell percentage which equals the InfoBase households with a credit card in cell (for DMA, Personicx cluster and income ranges) divided by the total InfoBase households in DMA. A transactional household cell weights file or database (File 2.4A) is created and contains the following attributes: DMA, Personicx cluster code, income, number of households, and InfoBase cell percentage. The output files of Process 2.3 and Process 2.4 are then compared in Process 2.5 to compute the weights that were shown in Table 3 in the above example.

Process 2.5 computes the cell balancing weight for each DMA by Personicx cluster codes and income ranges. Specifically, Process 2.5 computes the cell balancing weight which equals the InfoBase cell percentage (DMA, Personicx cluster and income ranges) divided by the cell percentage (DMA by Personicx cluster codes and income ranges). An InfoBase household cell weights file or database (File 2.5A) is created and contains the following attributes: DMA, Personicx cluster code, income, number of households, and cell percentage.

Process 2.6 then appends these weights to the MIR customer database (File 1.9A) such that each customer/household has a weight attached to it. This augmented database is the output file or database 2.6A. The following is an exemplary table of File 2.6A:

| Field | Start | End | Length | Format |
| --- | --- | --- | --- | --- |
| HH Number | 1 | 10 | 10 | Numeric |
| Customer Number | 11 | 20 | 10 | Numeric |
| Acct. Seq. Number | 21 | 30 | 10 | Numeric |
| Acct. Number | 31 | 48 | 18 | Character |
| Data Source Code | 49 | 52 | 4 | Character |
| Standard Business Code | 53 | 54 | 2 | Numeric |
| CCIS Service Code | 55 | 56 | 2 | Numeric |
| Acct. Purge Ind. | 57 | 57 | 1 | Character |
| Acct. Sub Type | 58 | 58 | 1 | Character |
| Emp. Imp. | 59 | 59 | 1 | Character |
| Stat Major Code | 60 | 60 | 1 | Character |
| Account Specific Data . . . | | | | |
| HH Demographics . . . | | | | |
| Census Data . . . | | | | |
| AbiliTec Link | | | | |
| Standard Name & Address Data | | | | |
| Balancing weight | | | | |
| Penetration Factor | | | | |

Figure 14:
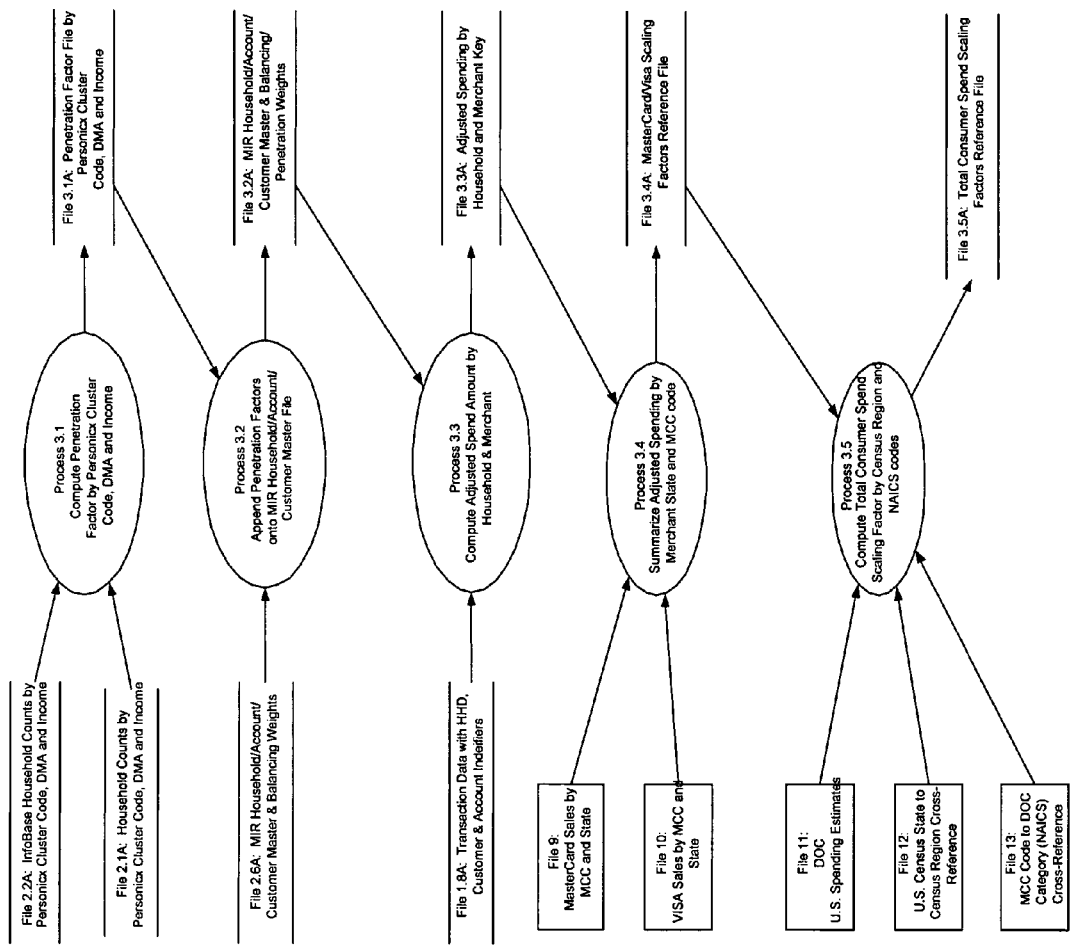
FIG. 14 is an exemplary flowchart of a method for determining the penetration factors in accordance with an embodiment of the present invention.

Referring to FIG. 14, an exemplary flowchart of a method for determining the penetration factors in accordance with an embodiment of the present invention is illustrated. Starting with the count files that were created in the balancing process (Files 2.1A and 2.2A), Process 3.1 computes the penetration factor which equals the InfoBase households with credit card (for DMA, Personicx cluster and income ranges) divided by the households (for DMA, Personicx cluster and income ranges). Process 3.1 creates a penetration factor file or database (File 3.1A) containing the following attributes: DMA; Personicx cluster code, income, number of households, penetration factor.

Process 3.2 then appends the penetration factors onto the MIR household/account/customer master and balancing weight files base upon the to the DMA, Personicx cluster code and InfoBase income ranges, File 2.6A and outputs the file (File 3.2A). The following is an exemplary table of File 3.2A:

| Field | Start | End | Length | Format |
| --- | --- | --- | --- | --- |
| HH Number | 1 | 10 | 10 | Numeric |
| Customer Number | 11 | 20 | 10 | Numeric |
| Acct. Seq. Number | 21 | 30 | 10 | Numeric |
| Acct. Number | 31 | 48 | 18 | Character |
| Data Source Code | 49 | 52 | 4 | Character |
| Standard Business Code | 53 | 54 | 2 | Numeric |
| CCIS Service Code | 55 | 56 | 2 | Numeric |
| Acct. Purge Ind. | 57 | 57 | 1 | Character |
| Acct. Sub Type | 58 | 58 | 1 | Character |
| Emp. Imp. | 59 | 59 | 1 | Character |
| Stat Major Code | 60 | 60 | 1 | Character |
| Account Specific Data . . . | | | | |
| HH Demographics . . . | | | | |
| Census Data . . . | | | | |
| AbiliTec Link | | | | |
| Standard Name & Address Data | | | | |
| Balancing weight | | | | |
| Penetration Factor | | | | |

Process 3.3 takes File 1.9A, adds the relevant weights to each transaction, and also computes adjusted transaction amounts (amount*balancing weight*penetration factor for each transaction record). That is, if a transaction was for $15 and was made by a customer that has been assigned a weight of 2, and a penetration factor of 5, then that transaction represents $15*2*5=$150 in spend. These factors, attached to File 1.9A, and File 2.6A (MIR customer information database) represent the core MIR transaction warehouse 310 information that is used for analysis. The adjusted spend amounts are then summarized by the household and merchant key.

The specific steps of Process 3.3 are: merge the transactions and the customer master data by household number; compute adjusted spending (Amount*Balancing Weight*penetration factor) for each record; summarize adjusted spending by household and merchant key; and create adjusted spending by household and merchant key file containing the following attributes: household number, merchant key, merchant zip code, merchant state, MCC code, and adjusted spending.

The next two processes (Processes 3.4 and 3.5) are designed to scale-up the total spend amounts to represent total relevant consumer spending. While these scaled-up totals are not required for relative comparisons, they are necessary if any consumers spend total information is shared with clients. Process 3.4 computes the scaling factors, e.g., MasterCard and Visa scaling factors, computer the scaled spending amount and summarizes the results by (merchant state and MCC code). Process 3.4 computes scaling factors that allow the total to represent total credit card sales. This is done by using spending information, such as Visa and MasterCard spend information (Files 9 and 10).

The specific steps of Process 3.4 are: merge the Master-Card and Visa sales files by merchant state and MCC code and summarize sales; merge the adjusted spending by household and merchant key file and the Visa/MasterCard sales together by merchant state and MCC code; compute MasterCard/is a scaling factor for each merchant state and MCC combination. The MasterCard/Visa scaling factor equals the MasterCard/Visa sales divided by the adjusted spending; compute MasterCard/Visa scaled spend which equals the adjusted spending times the MasterCard/Visa scaling factor; summarize MasterCard/Visa scaled spend by merchant state and MCC code; and create the MasterCard/Visa scaling factor reference file or database (File 3.4A) containing the following attributes: merchant state, MCC code, MasterCard/Visa scaling factor; and MasterCard/Visa scaled spend.

The next scaling factor is to go from credit card spend to total relevant consumer spend (including cash, check, etc). This is done in Process 3.5 where several government consumer spend data sources such as the DOC (Department of Commerce) are used to compute scaling factors by industry code and census region. Output Files 3.4A and 3.5A contain these factors. The specific steps of Process 3.5 are: merge the MasterCard/Visa scaling factor reference file with the U.S. census state to census region cross-reference file by merchant state to assign the census region; merge the results from step I with the MCC code to DOC industry categories (NAICS codes) cross-reference file by MCC code to assign the corresponding NAICS code; summarize MasterCard/Visa scaled spend by census region and NAICS codes; merge the results from step 3 with the DOC U.S. spending estimates by census region and NAICS codes; for each census region and NAICS code compute the total consumer spend scaling factor which equals the DOC spend divided by the MasterCard/Visa scaled spend; and create the total consumer spend scaling factors reference file or database (File 3.5A) containing the following attributes: merchant state, MCC code, census region, NAICS code, and total consumer spend scaling factor.

Figure 15:
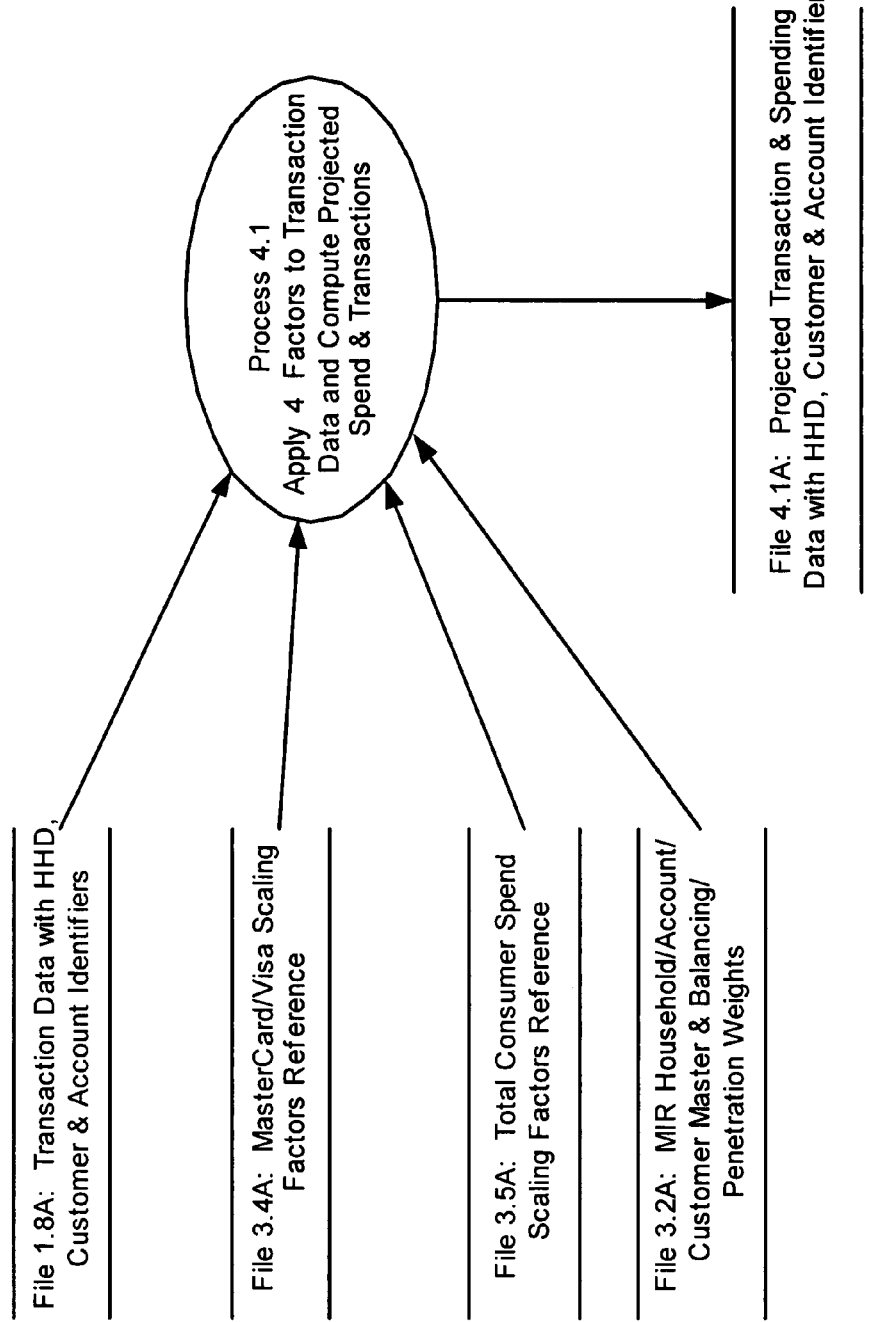
FIG. 15 is an exemplary flowchart of a method for periodic processing in accordance with an embodiment of the present invention.

Referring to FIG. 15, an exemplary flowchart of a method for periodic processing in accordance with an embodiment of the present invention is illustrated. The methods described above create the weights and factors that are used on a periodic basis to supplement the data in the MIR transaction warehouse 310. Process 4.1 applies uses the four factors that represent the balancing weight, penetration factor, and the two scaling factors and outputs a database or File 4.1A that is added on a periodic basis to the MIR transaction warehouse 310 and that can now be used by MIR front-end. In the preferred embodiment, the MIR transaction warehouse 310 is supplemented on a weekly basis. The specific steps of Process 4.1 are: merge the transaction data file with the customer master data file by household and append the balancing weight and penetration factor onto each transaction record; merge the results from the first step with the MasterCard & Visa scaling factor reference file by merchant state and MCC code to append the MasterCard/Visa scaling factor onto each transaction record; merge the results from the second step with the total consumer spend scaling factor reference file by merchant state and MCC code to append the total consumer spend scaling factor onto each transaction record; compute for each record the projected spend amount which equals the amount multiplied by balancing weight multiplied by the penetration factor multiplied by the MasterCard/Visa scaling factor multiplied by the total consumer spend scaling factor; append the projected spend amount to each transaction record; and output the following a transaction record having: record code, account number, MCC, sale date, amount, merchant (Bin number), merchant zip, merchant location (state), POS entry mode, merchant description field, standardized merchant name, standardized merchant store number, standardized merchant city, standardized merchant zip, city proprietary classification, customer identifier, household identifier, balancing weight, penetration factor, MasterCard/Visa scaling factor, total consumer spend scaling factor, projected spend amount, and projected transaction.

Panel Card

While the transaction warehouse 310 includes transaction information and customer information, there are several data elements that can further enhance the value of MIR, such as product details for transactions and customer attitudes, etc. One of the features of the MIR is the ability to address a client's needs in a flexible, purchase-specific and near real time consumer panel information process. This is done through the Panel Card component 330 (FIG. 3). In addition, card members can opt-in and provide, via web-based interaction, both qualitative information and deeper purchase details (e.g., SKU, department) particular to their purchase-triggered specific credit card transactions. This incremental panel information can be combined in a variety of ways with scanner information, purchase information, and publicly available demographic data to create unique and powerful industry and purchase category specific insights. The selection and construction of the panel questions are tailored either by the information needs of specific MIR clients on a more general-purpose basis by the MIR management. The panel questions can be influenced by any aspect of the specific transaction (e.g., industry segment, amount, day, location, merchant).

Using web-enabled interaction, each panelist is expected, on a periodic and frequent basis to provide either additional purchase detail, or answer a brief set of questions. The web tool is designed to simplify the process and to prompt the panelist for relevant responses. The panelist can be motivated through a reward system, e.g., a free wallet usage, for their timely, accurate and complete information. The panelist's enrollment can include the appropriate "opt-in" agreements that will provide the MIR system 300 with rights to use of the data, but will also detail limitations that could otherwise hinder participation (e.g., sale of the panelists' names to third parties).

The combining of the panel data with other MIR information can employ statistical techniques known in the art to match geographically and demographically similar clusters of consumers. Scanner information and data from other panels requires the approval of the consumer. The card issuing institution can benefit from increased usage and card member retention. Each panelist can be recruited from either the existing portfolio or as part of a specialized acquisition program.

Figure 16:
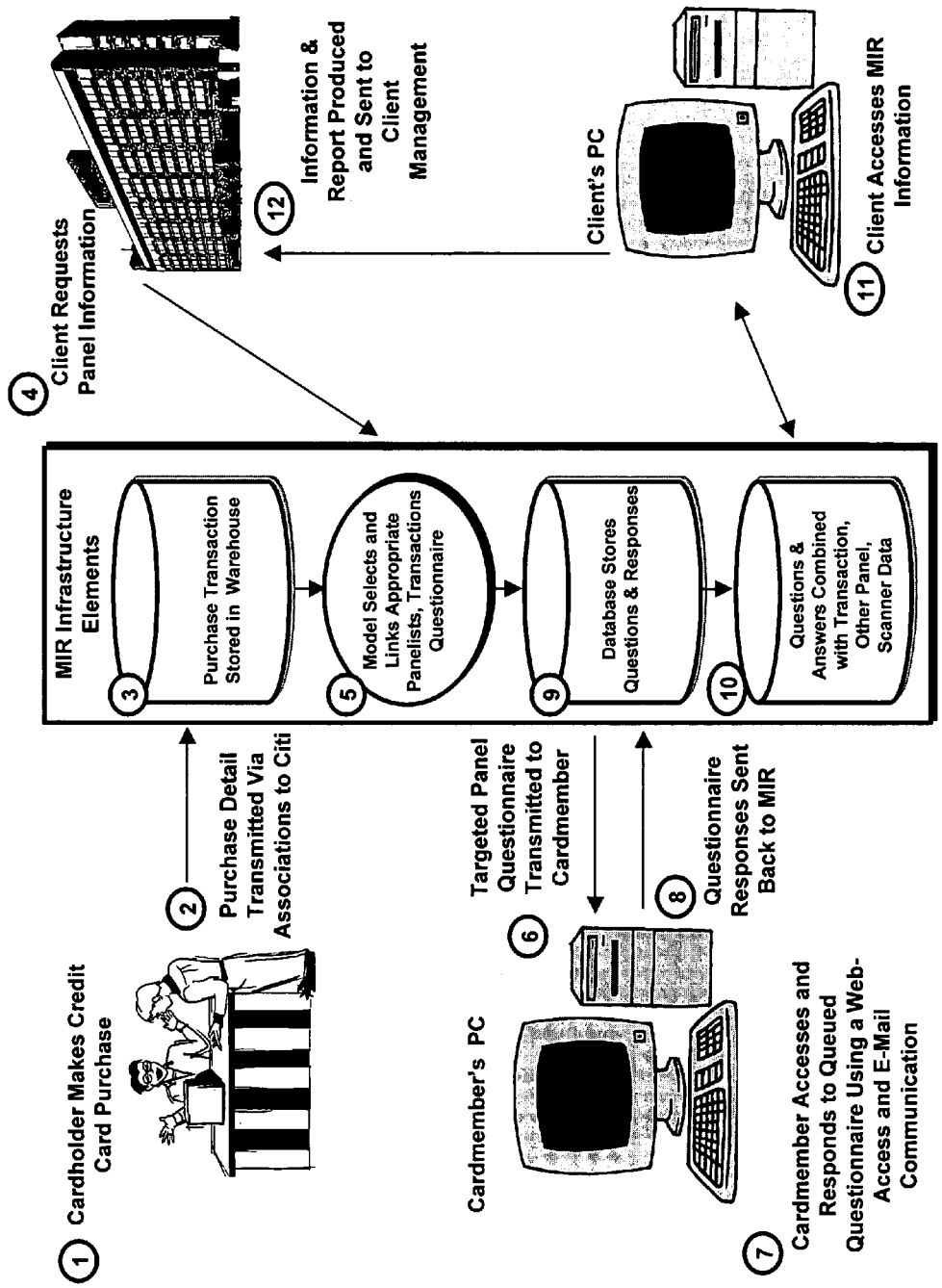
FIG. 16 is a block diagram of an MIR panel card methodology in accordance with an exemplary embodiment of the present invention.

Referring to FIG. 16, a block diagram of an MIR consumer panel information process executed by the panel card component 330 in accordance with an exemplary embodiment of the present invention is illustrated. As shown, the process starts with a cardholder making a purchase with his/her card. The purchase details are then transmitted to the MIR system 300. The purchase transaction is stored in the MIR transaction warehouse 310 (or MIR warehouse server 420) as described earlier. When a client requests panel information, the client selects a model, the appropriate panelists are linked, and the transaction questionnaire is generated. The target panel questionnaire is transmitted to one or more cardholders. The cardholders accesses and responds to queued questionnaire, e.g., using a web-access and email communication. The questionnaire responses are then sent back to the MIR system 300. The questions and answers from the questionnaire are stored in a database residing in, e.g., the MIR warehouse server 420. The questions and answers are combined with transaction, other panel and scanner data. The data is then provided to the client, e.g., the client accesses the data via the MIR system 300 using a personal computer.

Figure 17:
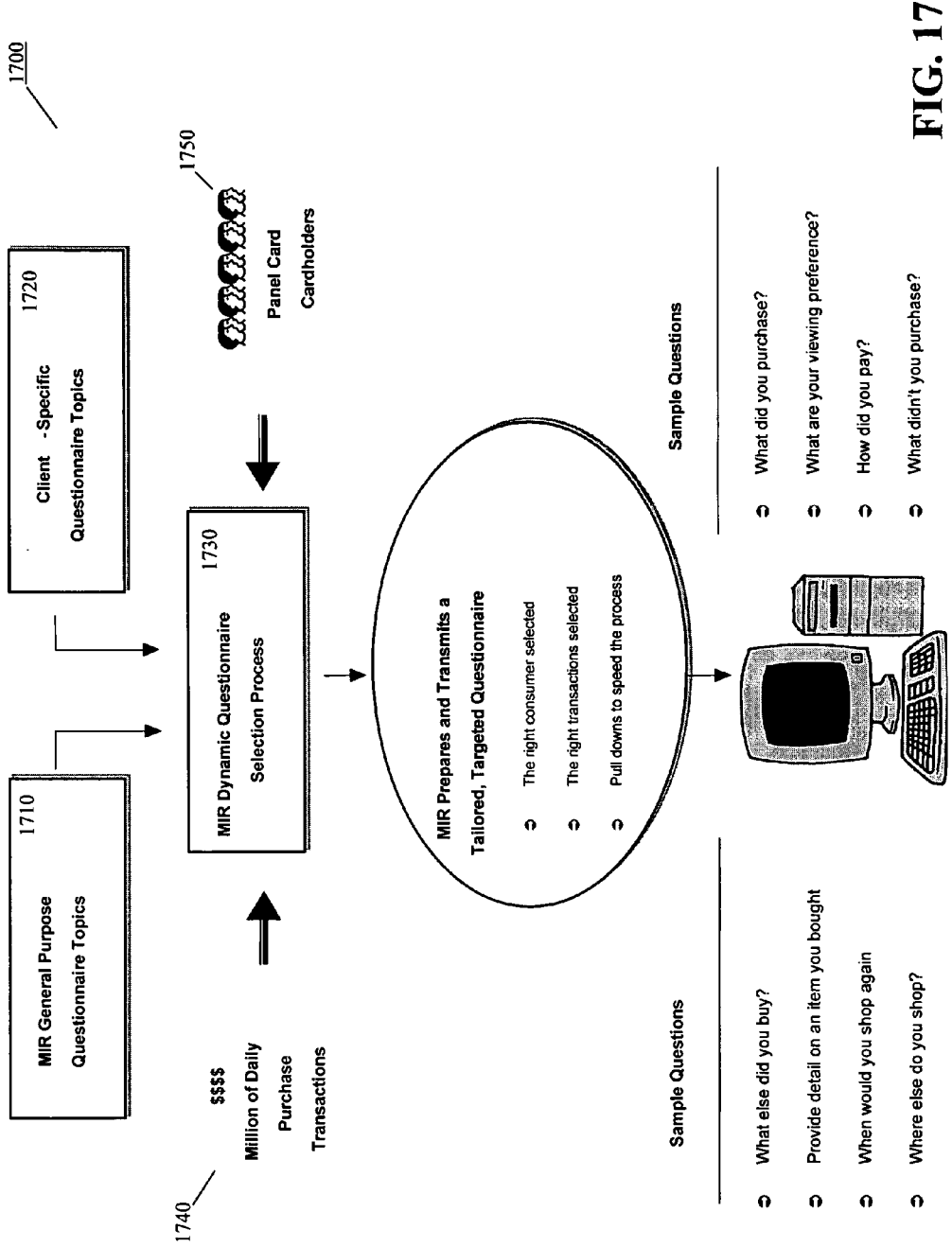
FIG. 17 is a block diagram of a tailored, targeted card process in accordance with an exemplary embodiment of the present invention.

Referring to FIG. 17, a block diagram 1700 of a tailored, targeted card process in accordance with an exemplary embodiment of the present invention is illustrated. As shown, the dynamic questionnaire selection process can include general purpose questionnaire topics 1730, client-specific topics 1710, transaction data 1740 as described earlier, and panel card cardholders 1750. The MIR system prepares, and transmits a tailored, targeted questionnaire. Consumers or panelists can be selected based on their transactions. Panelists can be associated with one or multiple panels and preferably receive targeted, dynamic questionnaires. In the preferred embodiment, the questionnaire includes pull-down menus. Sample questions can include: what else did you buy; provide detail on an item you bought; when would you shop again; where else do you shop; what did you purchase; what are your viewing preferences; how did you pay; what didn't you purchase; etc.

Figure 18:
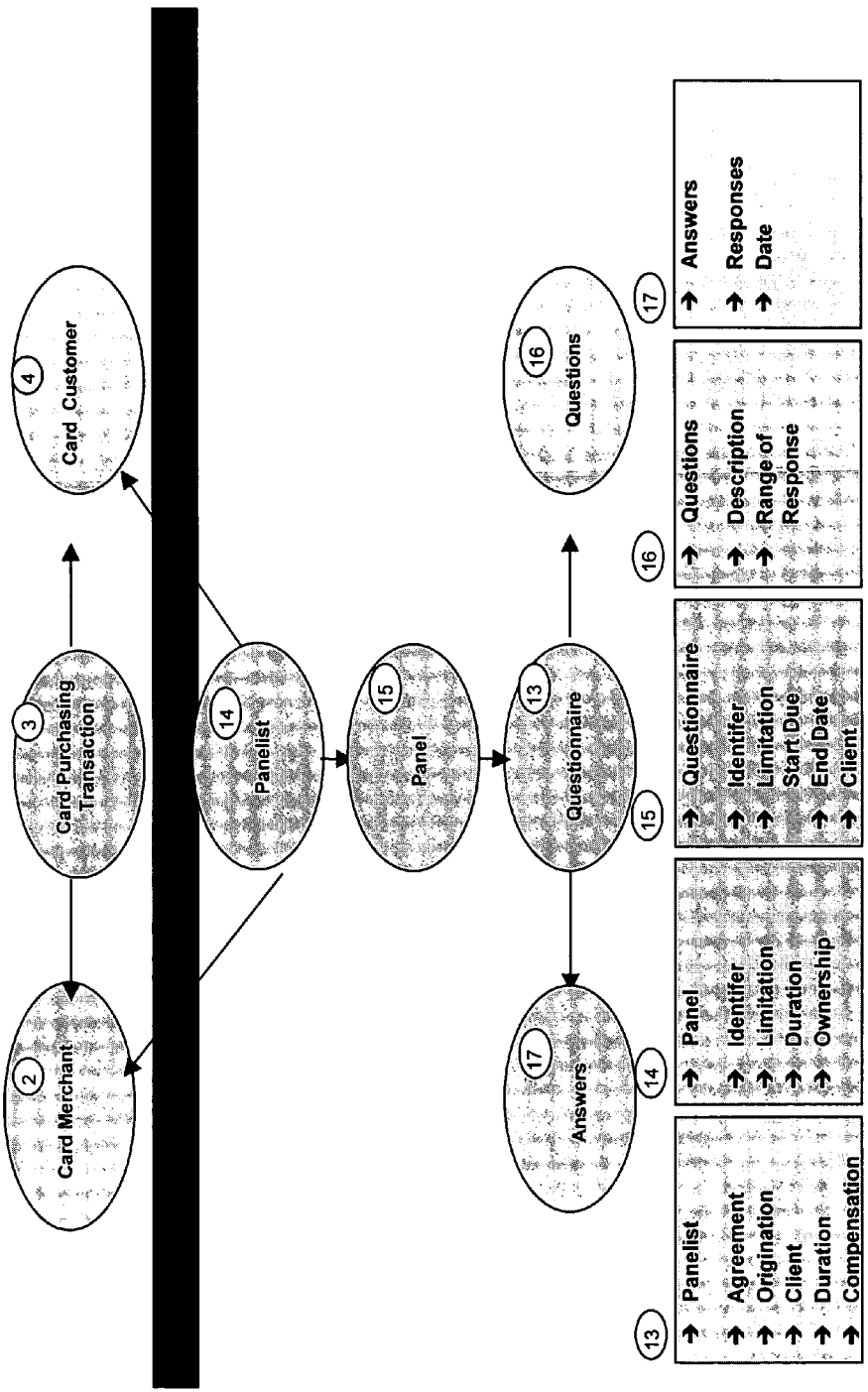
FIG. 18 is a block diagram of a panel card data resource in accordance with an exemplary embodiment of the present invention.

Referring to FIG. 18, a block diagram of the panel card data resource in accordance with an exemplary embodiment of the present invention is illustrated. The figure illustrates the different data pieces in the overall data model and how they are connected. The data model for the panel card is related directly to the primary customer-transaction-merchant data structure detailed in FIG. 7 (data sources 2, 3, 4 in FIGS. 7 and 18). The panel information environment (data sets 13-17) refers to the data architecture of the panel card specifically and are linked on customer, merchant and transaction based triggers to each other and to the MIR data warehouse. The specific data elements of each dataset are highlighted in the boxes at the bottom of the figure. Each set of questions (16) are linked to questionnaires (15), which are linked to panelists (13), panels (14) and a database containing the answers (17). That is, each panelist who belongs to a panel and who receives a targeted, dynamic questionnaire, will be linked to a card customer who consummates transactions at a set of merchants. Accordingly, each question within a questionnaire is customized and routed to a panelist card customer. The completion of the questionnaire is tracked and the panelist's rewards are determined based on the combination of buying behavior activity and the timeliness of the questionnaire completion. The targeted questionnaires are transmitted via an e-mail with experience immediately after the triggering purchases. Pull down menus simplify the response process and only relevant questions are posed to the panelist. The features or functionality of the panel card application can include longitudinal program alternatives, contact management features, motivational techniques, and triggers/selections options. Examples of longitudinal program alternatives include a one-time survey to address a specific client question and need and an ongoing panel to understand specific customer behavior. Preferably, panels do no include survey interactions. Contact management features can include application features that manage and control customer interaction through tracking of questionnaire volume and response tracking to ensure quality. Motivational techniques includes techniques to maintain customer willingness to participate in the panel. These techniques can include means to ensure that transactions are maintained or increased for panel customer participants, that questionnaires are answered with a high enough response rate, and that the responses are in a timely fashion. The triggers/selection options refers to ways in which customers are selected for participation in panels or surveys based on their history of transactions and real time events that can initiate a questionnaire.

The panel card client management process preferably includes three components: client/prospect, a panel card client manager and a panel card analyst/programmer. A client/prospect is a buyer of the panel card services who needs specific answers and insight from customers about one or more questions. Often, these clients are marketers. The client/prospect define the business information that is required which can include such information as what information is needed, who the target population is, the desired accuracy and sets the time for the project. The panel card client manager(s) responsibilities can include designing the right research study, managing the delivery and key parameters of the research such as the right trigger events to use, the right population of customers to target, the segmentations that will be used for the study, and the analytic tools which will be used. The panel card analysts/programmers are the individuals who build and execute the research study through interacting with the application, creating the questionnaires, managing the execution of the study and do the analyses on the information collected that will be delivered to the client through the client manager. The responsibilities of the panel card analyst/programmer can include the selecting the rules, composing the email messages, composing the web based questionnaire, scheduling, providing the analysis and reporting, controlling the execution of the project.

Figure 19:
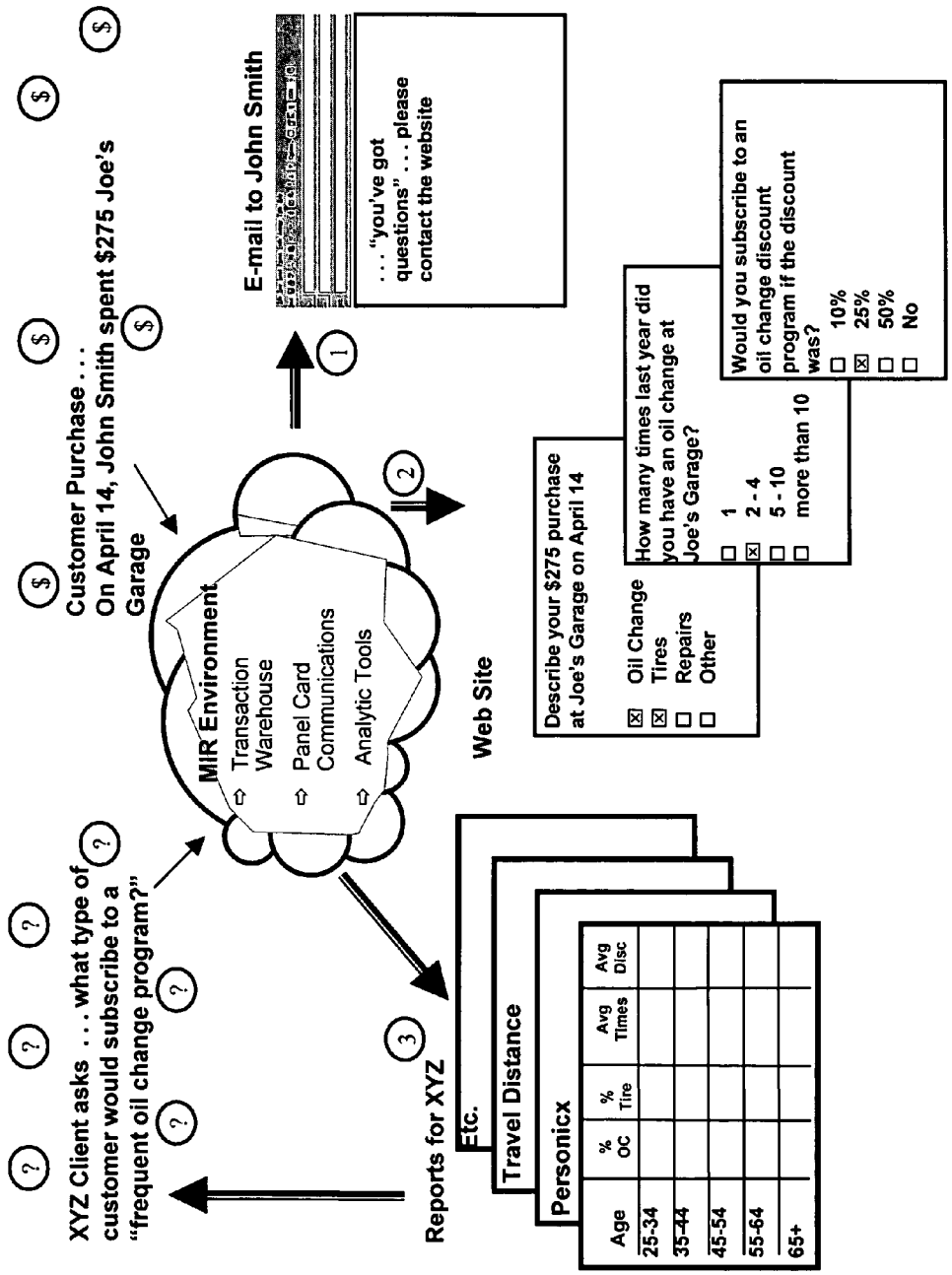
FIG. 19 is a block diagram of a panel card architecture in accordance with an exemplary embodiment of the present invention.

Referring to FIG. 19, a block diagram of the exemplary panel card architecture in accordance with an embodiment of the present invention is illustrated. In the embodiment shown, the panel card architecture includes one or more databases. These databases can include the MIR transaction warehouse 300, the panelist register, the questionnaire library, and the card member database (e.g., File 1.9A). As described earlier, the MIR transaction warehouse 300 can include data relating to transactions, merchants, card members, etc. The panelist register can include history information, details on customers who are enrolled in the panel, how they will be rewarded, limitations, preferences, and any other relevant information that can be used in the panel process. The questionnaire library can include the questions and the surveys. The card members database can relevant segmentation and other demographic criteria of the card holders to be used for the panel card application. The databases are used by the panel card application, e.g., a design engine such as E.Piphany and a tool for configuring and delivering the questionnaires such as Confirmit. The panel card application can start a communication cycle that involves delivering emails to panel participants, a website to allow questions to be answered by participants, a voice response unit (VRU) that will provide customer service, the analyses and reporting that will be done for clients, reward programs, etc.

Figure 20:
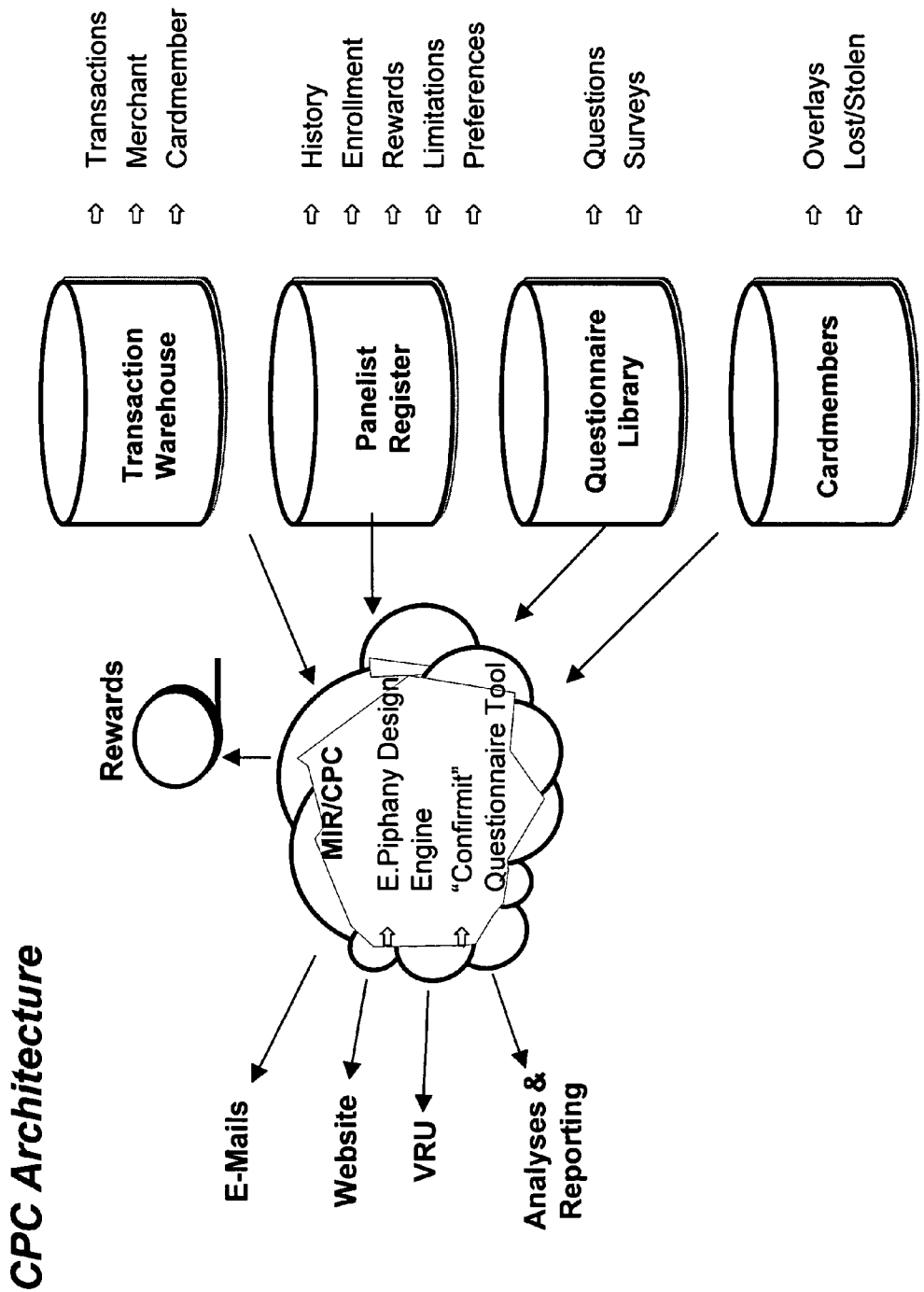
FIG. 20 is a block diagram of an exemplary communications cycle for the panel card application in accordance with an embodiment of the present invention.

Referring to FIG. 20, a block diagram of an exemplary communications cycle for the panel card application in accordance with an embodiment of the present invention is illustrated. Preferably, the communication cycle starts with one or more questions from a client. For example, XYZ client would like to know what type of customer would subscribe to a "frequent oil change program?" From that question, the MIR system/environment identifies customers who can answer the client's question. This is done based on evaluating transactions in the MIR transaction warehouse to find individuals who have made a relevant purchase, e.g., on April 14, John Smith spent $275 at Joe's Garage. Once the individuals have been selected, emails are sent to the customer notifying them that there are a set of questions for them to answer on a website., e.g., a panel card website. The individual goes to the website and answers one or more questions. In the preferred embodiment, an interactive questionnaire is provided to the individual and the individual answers specific questions that are tailored to address the overall client question. Once enough individuals answer these questions and they have been summarized, analyzed by MIR, then the relevant reports are generated and are sent to the client.

The following examples demonstrate some functionality of the MIR system. The first example is using a customer spending analyses which assists in merchant targeted prospecting. Using card holder data combined with commercially available (demographics, clusters, InfoBase, Personicx, etc.) data, models and analyses can be created, which will help a merchant determine detailed (but not at an individual level) profiles of their customer/prospect base. These are used to define appropriately targeted prospecting criteria. The merchant is able to take these criteria to their data/list providers to produce a targeted list of prospects.

An exemplary methodology uses store/category profiling and target building and contains and manipulates information that is only available under the card issuer company's umbrella (on the MIR side of the firewall). For a particular merchant, the MIR system compiles all card members who shopped at that merchant or that merchant's custom category (for example, 9 West might be the merchant and Upscale Women's shoes might be the category). The MIR system can produce an analyses on these customers, which might include: distributions across key segments/clusters/groups; mean comparisons of key segments; potential estimates by segments; and target modeling using information that can be projected to the segment level.

Since the key targeting drivers are the segments that represent their best customers/prospects, one step is determining these segments. There are three levels of segments that can be used: (1) Off The Shelf—these are commercially available, already existing segment/clusters that can be overlaid to the customer base. These include such segments as Personicx, Prizm, and/or Simmons. A typical report might determine that 9 West is getting their biggest increase in customers in Personicx clusters 6 & 12. 9 West could then go to their mail shop and target any census household in their trade area who is cluster 6 or 12. (2) MIR Standard Spend Clusters—Using sound statistical clustering/segmenting tools on the card base spending, demographic, financial and lifestyle information, a standard set of spend segments is developed. Each customer is assigned to a segment. A typical report can then determine 9 West is getting their biggest increase in customers in card issuer company's segments 6 & 12. Card issuer company can then create a scoring algorithm which can determine which US households were segments 6 & 12 using only commercially available information (for example, card issuer company's segment 6 may be highly correlated with InfoBase Homeownership and car value information.) 9 West could then go to their mail shop and target any census household in their trade area, based on the algorithm using only InfoBase data and no card issuer company's specific information, is segment 6 or 12. (3) Card issuer company's Custom Spend Clusters—Similar to #2 above, segments are customized based only on the customers in the base who had shopped at 9 West or the upscale women's shoe category. Using sound statistical clustering/segmenting tools on the card issuer company's base spend, demographic, financial and lifestyle information, a custom set of spend segments within the Upscale shoe base can be developed. Each customer is then assigned a segment. A typical report might then determine 9 West is getting their biggest increase in customers in card issuer company's Shoe Segments 6 & 12. The card issuer company can then create a scoring algorithm which determines which US households were segments 6 & 12 using only commercially available information (for example, card issuer company's Shoe segment 6 may be highly correlated with InfoBase Home ownership and car value information.) 9 West could then go to their mail shop and target any census households in their trade area, based on the algorithm using only InfoBase data and no card issuer companies specific information, is segment 6 or 12.

A merchant may want to take the profiling to the next level of detail, which can be at the product (SKU) or merchant segment level. All the product outputs can be the same as the store profiling and Target Building, but can go down one more level. So for example, instead of analyzing 9 West customers as a whole, 9 West heel vs. pump customers can be distinguished. To accomplish this, merchant specific information such as SKU sales (outside the firewall) needs to be merged with card issuer company's information by the account number making the purchase. Once the information is appended it can be summarized and segmented as before, eliminating any customer level information.

The information is delivered as a set of reports delivered to the merchant or available online on a regular basis, In addition, if the card issuer company's Custom Spend Cluster option is exercised, a one-time report describing these clusters can be provided. Where the segments do not appear on commercially available databases, specific selection criteria can provided.

The following example includes a merchant trade area analysis using daytime population factors. Using transaction data and card member geo-code, a specific merchant's true trade area by ZIP can be defined. Reports and maps can be used by merchants for better site location, local newspaper/advertising inserts and direct marketing and targeting. By having more accurate trade areas merchants are able to benchmark performance at a much more accurate level.

For a particular client location in a particular DMA (Direct Marketing Area, e.g., Chicago) all card members who shopped at that client's store are compiled, what their geo-code information is and what large customer segment they belong to. The distance to store is calculated and summarize this information by distance and segment (for example, a store with 100,000 customers, 60,000 live within 5 miles of the store and 30,000 of those are in segment 1.) The summaries are then benchmarked to the area so profiles and potential can be determined. The information will never go back down to the individual level from this point on.

The information can be delivered as a series of maps and reports to the client. The client can use these reports to determine a proper marketing plan and category management. In addition, the client may want to direct market to all segment 1 households in the true trade area (as provided by the list providers in the marketplace, not Card issuer companies) to get them to come into the store. Although this is still a large number, it should be smaller than the mailing to the entire DMA and save thousands in mailing costs.

In the following example, an alternative method to building reports is discussed in which CHAD/CART models are used. CHAD is a popularly accepted method of reducing a large survey type of exercise aimed at segmenting people into like sets of behaviors or attitudes into a "short form" without sacrificing predictive accuracy. An exemplary product can include: (a) examining detailed transaction data using a card issuer companies base and construct segments such as those described above (i.e., those that describe propensity to behave in a particular way.) Enhance the resulting general segments with specific SKU item level detail from either a purchased source or in collaboration with a client. This matching can be on an account number basis only. For example, it is possible to go to Macy's and ask them for their billing logs and then match up the customer card number with the Macy bill and extract the SKU level detail from the bill. (b) the CHAD technique is used to reduce these sets of behaviors to a "short form" set of indicators found commonly in all data sets (e.g. age, sex, zip code, etc.). This allows clients to apply this short form to all their own customers in order to determine various propensities such as: propensity to buy a particular item in the store; propensity to shop on price; propensity to stay loyal to the store; propensity to shop often; etc. These segments and propensity indicators can continually be updated and can be made available to the client.

The range of data and analyses that can be used to make informed business decisions include category, organization/unit, and brand level data. The applications of market level data can be broken down into four groupings: category; brand/unit; aggregate consumer profiling/targeting and analytics/market mix modeling. Category-level data can include historical data on the category describing the conditions in which the organization and brand have been functioning and, combined with informed predictions, helps to shape the forming of business objectives and provide fuel for new products or offerings. Examples of category reports and analysis can include: overall category spending and/or units purchased; past month vs. YAG (year ago), Past Qtr vs. YAG, Past Year Vs Past Year(s); major sub-category level data (where available as in the Airline Industry); customers will likely have defined both the category (e.g. retail apparel) and any sub-categories (e.g. dept stores, apparel chains, off-price). Data can be broken out by geography (as per business requirements) and customer segments (however defined by the business, e.g. socio-demographic groups, psychographics segments, third-party lifestyle/purchasing segments such as third party overlay data, e.g. Personicx). Marketing questions can be addressed, the questions can include: contributes to understanding the general market to conduct a situation analysis that can encompass all macro trends; how is consumer confidence/spending changing; what are the trends and category shifts.

Brand/business unit share data can include data that is defined category or sub-category, any business must have an accurate share metric reportable at national, regional and trading area levels. Tracking share performance is most useful at the weekly level so that marketing and promotional activities can be more accurately assessed through regression—based modeling.

It is valuable that business-to-consumer businesses understand who their customers are (and who their "best" customers are) and what's important to them. Once identified, marketing programs are developed to ensure continued loyalty of current customers, win back lapsed customers, and/or attract new customers/increase share.

Accordingly, embodiments of MIR system and method of the present invention offers a major opportunity either as an enhancement or alternative metric to POS data in categories that are credit-card intensive. Aggregate consumer profiling/targeting is directed at targeting activity can be broadly divided into two areas: identifying key customer target segments and tracking the success of any merchandising and promotional efforts against these segments.

Although the invention has been described with reference to these preferred embodiments, other embodiments could be made by those in the art to achieve the same or similar results. Variations and modifications of the present invention will be apparent to one skilled in the art based on this disclosure, and the present invention encompasses all such modifications and equivalents.

The invention claimed is:

1. A resource system for providing market insights comprising:
    a transaction database server that includes a transaction database and a first customer information database, wherein:
        the transaction database configured to store at least card transaction data;
        the first customer information database configured to store at least customer and household information identifying card holders; and
        the transaction database is coupled to and interacts with the first customer information database to associate the customer and household identification information with the card transaction data;
    a card analytical services component that includes a plurality of reporting and analytical modules, the analytical modules providing marketing analyses based at least on the interaction between the transaction database and the first customer information database,
        wherein the analytical modules are configured to analyze information directed towards:
            how stores or segments within a store perform relative to a peer group,
            revenue by customer or geography,
            economic indicators at an industry or merchant level,
            trends showing customer buying preferences across industries,
            where customers live relative to prospective sites,
            profiling of buyers segments of specific goods or services, and
            profiling competitor groupings, and
        wherein the reporting modules provide marketing-related reports based at least on the marketing analyses provided by the analytical modules, including identifying the sales effect of a campaign, market share based on a geographic segment, demographics of a company's customers, or shopping habits of the company's customers;
    a panel card component creating a transaction questionnaire based at least on the card transaction data from the transaction database, sending an e-mail to each of a plurality of customers, based on the card transaction data of the plurality of customers, requesting that the plurality of customers complete the transaction questionnaire on a website and to receive responses to the questionnaire; and
    a value shopper component providing targeted sales programs to customers identified based at least on the marketing analyses, the marketing-related reports, the questionnaire, and the associated responses to the questionnaire.

2. The system of claim 1, wherein the reporting modules include:
    a first reporting module providing information relating to distance, density, and demographic of customers; and
    a second reporting module providing a correlation report of customer behaviors to market spending and talent management based on the first customer information database.

3. The system of claim 1, further comprising an applications database server, the applications database server maintaining the card analytical services component, the panel card component, and the value shopper component.

4. The system of claim 1, wherein the card analytical services component includes an information transformation and enhancement module receiving the card transaction data and transform and enhance the card transaction data based on predetermined criteria.

5. The system of claim 4, wherein the information and enhancement module includes:
a first module generating at least a summary table from the card transaction data summarizing transaction details on individual customers to create a dataset for use in appending additional data to the card transaction data.

6. The system of claim 5, wherein the information and enhancement module further includes:
a second module appending customer-specific additional data to the card transaction data based on the created dataset.

7. The system of claim 6, wherein the information and enhancement module further includes:
a third module appending non-customer-specific additional data to the card transaction data based on the created dataset.

8. The system of claim 1, wherein the customer information database is coupled to at least one database external to the system to receive and append customer segmentation and demographic information to the customer and household identification information.

9. The system of claim 8, further comprising:
a master transaction database storing the card transaction data and the associated customer and household identifiers.

10. The system of claim 9, further comprising:
a second customer information database storing the customer and household identification information appended with the customer segmentation and demographic information.

11. A computer-implemented method for providing market insights comprising:
receiving, by a server, card transaction data from purchases made with stored-value cards at a point-of-sale;
receiving, by a server, customer and household information identifying card holders of stored-value cards;
assessing, by a server, the card transaction data and the customer and household information to assign the customer and household information to the card transaction data;
analyzing, by a server, marketing information based at least on the assessing, wherein the marketing information is directed towards:
how stores or segments within a store perform relative to a peer group,
revenue by customer or geography,
economic indicators at an industry or merchant level,
trends showing customer buying preferences across industries,
where customers live relative to prospective sites,
profiling of buyers segments of specific goods or services, and
profiling competitor groupings;
generating, by a server, marketing-related reports based at least on the provided marketing information;
generating, by a server, a transaction questionnaire based at least on the received card transaction data;
sending, by a server, an e-mail request to each of a plurality of customers, based on the card transaction data of the plurality of customers and the analysis of the marketing information, to complete the transaction questionnaire on a website;
receiving, by a server, at least a response to the transaction questionnaire; and
providing, by a server, a targeted sales program based at least on the marketing information, the marketing-related reports, the questionnaire, and the at least one response to the questionnaire.

12. The method of claim 11, wherein the generated marketing-reports comprises:
providing information relating to distance, density, and demographic of customers; and
providing a correlation report of customer behaviors to market spending and talent management.

13. The method of claim 11, wherein at least one of the stored-value cards includes one of: a credit card, a debit card, a smart card, an optical card, and a magnetic-stripe card.

14. The method of claim 11, wherein the providing the assessing the card transaction data comprises:
transforming and enhancing the card transaction data based on predetermined criteria.

15. The method of claim 14, wherein the transforming and enhancing comprises:
generating at least a summary table from the card transaction data summarizing transaction details on individual customers to create a dataset for use in appending additional data to the card transaction data.

16. The method of claim 15, wherein the transforming and enhancing further comprises:
appending customer-specific additional data to the card transaction data based on the created dataset.

17. The method of claim 16, wherein the transforming and enhancing further comprises:
appending non-customer-specific additional data to the card transaction data based on the created dataset.

18. The method of claim 11, further comprising:
receiving and appending customer segmentation and demographic information to the customer and household identification information.

19. The method of claim 18, further comprising:
storing the card transaction data and the associated customer and household identifiers.

20. The method of claim 19, further comprising:
storing the customer and household identification information appended with the customer segmentation and demographic information.

* * * * *

UNITED STATES PATENT AND TRADEMARK OFFICE
CERTIFICATE OF CORRECTION

| | | |
|---|---|---|
| PATENT NO. | : 7,937,286 B2 | Page 1 of 1 |
| APPLICATION NO. | : 10/864529 | |
| DATED | : May 3, 2011 | |
| INVENTOR(S) | : Alan B. Newman | |

It is certified that error appears in the above-identified patent and that said Letters Patent is hereby corrected as shown below:

On the cover page, item (74) Attorney, Agent, or Firm should read:

Eric L. Sophir, SNR Denton US LLP

Signed and Sealed this
Ninth Day of August, 2011

David J. Kappos
*Director of the United States Patent and Trademark Office*